US010073516B2

(12) United States Patent
Larsen et al.

(10) Patent No.: US 10,073,516 B2
(45) Date of Patent: Sep. 11, 2018

(54) METHODS AND SYSTEMS FOR USER INTERACTION WITHIN VIRTUAL REALITY SCENE USING HEAD MOUNTED DISPLAY

(71) Applicant: Sony Interactive Entertainment Inc., Tokyo (JP)

(72) Inventors: Eric Larsen, San Mateo, CA (US); Frederick Umminger, San Mateo, CA (US); Xiaoyong Ye, San Mateo, CA (US); Noam Rimon, San Mateo, CA (US); Jeffrey Roger Stafford, San Mateo, CA (US); Xia Lou, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/745,267

(22) Filed: Jun. 19, 2015

(65) Prior Publication Data
US 2016/0187969 A1   Jun. 30, 2016

Related U.S. Application Data

(60) Provisional application No. 62/097,549, filed on Dec. 29, 2014.

(51) Int. Cl.
*G06F 3/01* (2006.01)
*G06F 3/0346* (2013.01)
(Continued)

(52) U.S. Cl.
CPC ......... *G06F 3/012* (2013.01); *G02B 27/0093* (2013.01); *G02B 27/017* (2013.01);
(Continued)

(58) Field of Classification Search
CPC ........ G06F 3/012; G06F 3/013; G06F 3/0346; G06T 19/006; G06T 19/003; G02B 27/017
(Continued)

(56) References Cited

U.S. PATENT DOCUMENTS 5,442,734 A * 8/1995 Murakami ............. G06F 3/012
345/419
5,490,784 A * 2/1996 Carmein ................ A63B 22/02
434/29

(Continued)

FOREIGN PATENT DOCUMENTS

| JP | 07028591 A | 1/1995 |
| JP | 2013254251 A | 12/2013 |
| JP | 2004233909 A | 8/2014 |

*Primary Examiner* — Fred Tzeng
(74) *Attorney, Agent, or Firm* — Martine Penilla Group, LLP

(57) ABSTRACT

Inertial sensors within a head mounted display are used to track movement of the head mounted display. The tracked movement of the head mounted display is correlated to an action within a virtual reality scene that is currently displayed to a user wearing the head mounted display. The action within the virtual reality scene is based on a context of the virtual reality scene that is currently displayed. The detected movement of the head mounted display can be combined with other sensor data, such as gaze detection data, to determine the action within the virtual reality scene. In this manner, movements of the user as detected using the inertial sensors within the head mounted display are used as inputs to cause actions within the current context of the virtual reality scene as displayed within the head mounted display to the user.

24 Claims, 16 Drawing Sheets

(51) Int. Cl.
*G06T 19/00* (2011.01)
*G02B 27/01* (2006.01)
*G06F 1/16* (2006.01)
*G02B 27/00* (2006.01)

(52) U.S. Cl.
CPC .............. *G06F 1/163* (2013.01); *G06F 3/013* (2013.01); *G06F 3/017* (2013.01); *G06F 3/0346* (2013.01); *G06T 19/006* (2013.01); *G02B 2027/014* (2013.01); *G02B 2027/0187* (2013.01)

(58) Field of Classification Search
USPC ......................................................... 345/156
See application file for complete search history.

(56) References Cited

U.S. PATENT DOCUMENTS

| | | | |
|---|---|---|---|
| 5,598,187 A | 1/1997 | Ide et al. | |
| 5,641,288 A * | 6/1997 | Zaenglein, Jr. | F41G 3/2633 434/17 |
| 6,630,915 B1 * | 10/2003 | Flood | G02B 27/017 345/8 |
| 6,757,068 B2 * | 6/2004 | Foxlin | G02B 27/017 356/139.03 |
| 7,148,860 B2 * | 12/2006 | Kooi | G02B 27/017 345/7 |
| 9,292,973 B2 * | 3/2016 | Bar-Zeev | G02B 27/017 |
| 2010/0009809 A1 * | 1/2010 | Carrington | A63B 71/0622 482/4 |
| 2011/0285704 A1 * | 11/2011 | Takeda | A63F 13/10 345/419 |
| 2012/0062444 A1 * | 3/2012 | Cok | G02B 27/0172 345/8 |
| 2012/0092328 A1 * | 4/2012 | Flaks | G02B 27/017 345/419 |
| 2012/0188148 A1 | 7/2012 | Dejong | |
| 2013/0222638 A1 | 8/2013 | Wheeler et al. | |
| 2013/0278631 A1 | 10/2013 | Border et al. | |
| 2014/0063060 A1 * | 3/2014 | Maciocci | G06F 3/011 345/633 |
| 2014/0282275 A1 | 9/2014 | Everitt et al. | |
| 2014/0361956 A1 * | 12/2014 | Mikhailov | A63F 13/5255 345/8 |
| 2014/0372944 A1 | 12/2014 | Mulcahy et al. | |
| 2015/0138301 A1 * | 5/2015 | Kim | G06F 3/011 348/14.04 |
| 2015/0212647 A1 * | 7/2015 | Kim | G02B 27/017 345/173 |
| 2015/0363976 A1 * | 12/2015 | Henson | H04N 13/044 345/419 |
| 2016/0041391 A1 * | 2/2016 | Van Curen | G02B 27/0172 345/633 |
| 2016/0054837 A1 * | 2/2016 | Stafford | A63F 13/825 463/33 |

* cited by examiner

| Movement Classification of Virtual Reality Scene | Direction of User Movement | Rate of User Movement |
|---|---|---|
| Casual Walk Forward | Lean Forward | Normal |
| Run Forward | Lean Forward | Fast |
| Sprint Forward | Lean Forward | Very Fast |
| Slow Walk Forward | Lean Forward | Slow |
| Move Left | Lean Left | Normal |
| Dodge Left | Lean Left | Fast |
| Move Right | Lean Right | Normal |
| Dodge Right | Lean Right | Fast |
| Move Backward | Lean Backward | Normal |
| Quick Stop of Forward Motion | Lean Backward | Fast |

Fig. 9B

METHODS AND SYSTEMS FOR USER INTERACTION WITHIN VIRTUAL REALITY SCENE USING HEAD MOUNTED DISPLAY

CLAIM OF PRIORITY

This application claims priority under 35 U.S.C. 119(e) to U.S. Provisional Patent Application No. 62/097,549, filed Dec. 29, 2014. The disclosure of the above-identified patent application is incorporated herein by reference in its entirety.

BACKGROUND

1. Field of the Invention

The present invention relates to methods and systems for user interaction within a virtual reality space.

2. Description of the Related Art

In virtual reality systems, a user becomes visually immersed in a computer generated three-dimensional virtual reality scene. In some applications, the entire virtual reality scene as displayed to the user is computer generated. In other applications, a portion of the virtual reality scene is computer generated, with another portion of the virtual reality scene corresponding to video and/or images of real-life objects and/or persons, where such real-life video/images can be rendered in the virtual reality scene in essentially real-time. Such applications may be referred to as augmented reality applications.

In many virtual reality applications, it is not only desirable to have the user feel visually immersed in the virtual reality scene, but it is also desirable to provide the user with a sense of natural interaction with features displayed within the virtual reality scene. It is within this context that the present invention arises.

SUMMARY

In an example embodiment, a method includes transmitting video data to a head mounted display for display of a virtual reality scene within the head mounted display. The method also includes receiving inertial sensor data from one or more inertial sensors within the head mounted display. The inertial sensor data indicates movement of the head mounted display in accordance with movement of a user by whom the head mounted display is worn. The movement of the user is based on the virtual reality scene displayed within the head mounted display. The method also includes correlating the received inertial sensor data to an action within the virtual reality scene. The method also includes generating an update to the virtual reality scene to reflect implementation of the action.

In an example embodiment, a method includes receiving video data at a head mounted display. The video data defines a virtual reality scene. The method also includes displaying the virtual reality scene within the head mounted display. The method also includes operating one or more inertial sensors within the head mounted display to generate inertial sensor data indicating movement of the head mounted display in accordance with movement of a user by whom the head mounted display is worn. The movement of the user corresponds to an action within the virtual reality scene. The method also includes transmitting the inertial sensor data to a computing system from which the video data is received. The method also includes receiving, from the computing system, video data defining an updated virtual reality scene reflective of the action within the virtual reality scene corresponding to the movement of the user. The method also includes displaying the updated virtual reality scene within the head mounted display.

In an example embodiment, a system includes an inertial data processing module configured to receive inertial sensor data from a head mounted display. The inertial sensor data indicates movement of the head mounted display in accordance with movement of a user by whom the head mounted display is worn. The movement of the user is based on a virtual reality scene displayed within the head mounted display. The inertial data processing module is configured to determine from the inertial sensor data a route of movement of the head mounted display and a rate of movement of the head mounted display. The system also includes an inertial data correlation module configured to correlate the route of movement of the head mounted display and the rate of movement of the head mounted display to an action within the virtual reality scene. The system also includes an inertial data command output module configured to provide a command signal to a rendering engine. The command signal directs the rendering engine to update the virtual reality scene to reflect implementation of the action.

In an example embodiment, a method includes transmitting video data to a head mounted display for display of a virtual reality scene within the head mounted display. The head mounted display is equipped with one or more inertial sensors configured to generate inertial sensor data indicating movement of the head mounted display in accordance with movement of a user by whom the head mounted display is worn. The virtual reality scene requests the user to make a gesture to cause a specific action within the virtual reality scene. The gesture causes movement of the head mounted display and generation of inertial sensor data corresponding to the movement of the head mounted display. The method also includes receiving inertial sensor data from the head mounted display. The inertial sensor data indicates movement of the head mounted display in response to the user making the gesture to cause the specific action within the virtual reality scene. The method also includes correlating the received inertial sensor data to the specific action within the virtual reality scene, such that the specific action is executed within the virtual reality scene upon subsequent receipt of inertial sensor data substantially equal to the inertial sensor data previously received.

In an example embodiment, a method includes transmitting video data to a head mounted display for display of a virtual reality scene within the head mounted display. The head mounted display is equipped with one or more inertial sensors configured to generate inertial sensor data indicating movement of the head mounted display in accordance with movement of a user by whom the head mounted display is worn. The virtual reality scene allows the user to make a gesture to cause a specific action within the virtual reality scene. The gesture causes movement of the head mounted display and generation of inertial sensor data corresponding to the movement of the head mounted display. The method also includes receiving inertial sensor data from the head mounted display. The inertial sensor data indicates movement of the head mounted display in response to the user making the gesture to cause the specific action within the virtual reality scene. The method also includes determining a route of user movement and a rate of user movement through processing of the received inertial sensor data. The method also includes determining a movement classification of the virtual reality scene corresponding to the received inertial sensor data. The method also includes correlating the received inertial sensor data to the determined movement classification of the virtual reality scene. The method also includes recording the correlation of the received inertial sensor data to the determined movement classification of the virtual reality scene in a profile of the user.

Other aspects of the invention will become more apparent from the following detailed description, taken in conjunction with the accompanying drawings, illustrating by way of example the present invention.

BRIEF DESCRIPTION OF THE DRAWINGS

FIG. 9B shows an example correlation of the received inertial sensor data to the determined movement classification of the virtual reality scene in the profile of the user, in accordance with an example embodiment of the present invention.

DETAILED DESCRIPTION

Figure 1A:
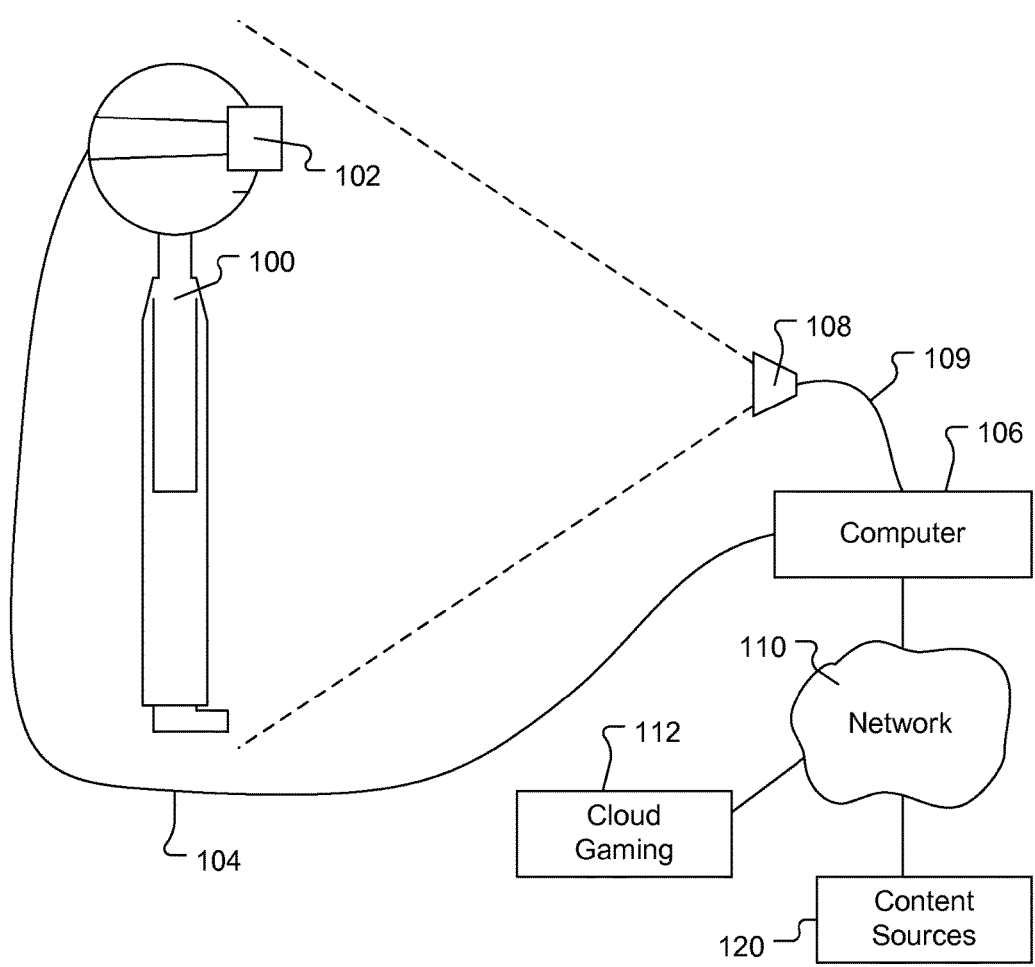
FIG. 1A shows a user wearing a head mounted display that is in communication with a computer system through a wired link, in accordance with an example embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the presented subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein are implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a mobile terminal, cellular phone, smart phone, computer (e.g., a desktop computer, tablet computer, laptop computer), game console, handheld gaming device, and so forth.

The term "head mounted display," as used herein, refers to one or more of the following: a wearable computer having a display, head mounted electronic device, a head-coupled display, a helmet-mounted display, a head-mounted computer with a display. The head mounted display, which is worn on a head of a user or which is a part of a helmet, has a small display optic in front of one (monocular display device) or each eye (binocular display device). The head mounted display has either one or two small display units with lenses and semi-transparent mirrors embedded in a helmet, eye-glasses (also known as data glasses) or visor. The display units can be miniaturized and may include a Liquid Crystal Display (LCD), Organic Light-Emitting Diode (OLED) display, or the like. Some vendors employ multiple micro-displays to increase total resolution and field of view. Some other head mounted displays do not use a traditional display at all and instead project light directly into the user's eyes.

FIG. 1A shows a user 100 wearing a head mounted display 102 that is in communication with a computer system 106 through a wired link 104, in accordance with an example embodiment of the present invention. The head mounted display 102 is worn in a manner similar to glasses, goggles, or a helmet, and is configured to display a video game or other content to the user 100. The head mounted display 102 is configured to provide an immersive experience to the user 100 through operation of its display components, such as optics and display screens, in close proximity to the user's eyes. Also, the format of the video content can be defined to display a virtual reality scene to the user 100 through the head mounted display 102, where the user 100 is made to have a sense of reality of presence within the virtual reality scene. In some embodiments, the head mounted display 102 can provide display regions for each of the user's eyes which occupy large portions or even an entirety of the user's field of view.

The computer system 106 can be any general or special purpose computer, including but not limited to a gaming console, a personal computer, a laptop, a tablet computer, a mobile device, a cellular phone, a tablet, a thin client, a set-top box, a media streaming device, among others. The computer system 106 is configured to render video and audio content and transmit the rendered content through the wired link 104 to the head mounted display 102. It should be understood that although the example of FIG. 1A includes the wired link 104, other embodiments can utilize wireless communication between the head mounted display 102 and the computer system 106, either alone or in combination with communication through the wired link 104. Also, in some embodiments, the head mounted display 102 can connect directly to the Internet.

The content rendered by the computer system 106 can be for essentially any type of computer application, and may include one or more types of content such as game, movie, audio, images, multimedia, among others. In some embodiments, the content, or portions thereof, is generated by the computer system 106. However, in some embodiments, the content, or portions thereof, is streamed from a remote content source 120 over a network 110 to the computer system 106. And, in some embodiments, the content, or portions thereof, is streamed from a cloud gaming infrastructure 112 over the network 110 to the computer system 106. The cloud gaming infrastructure 112 may also direct various types of content to be transmitted from the remote content source 120 over the network 110 to the computer system 106. An example remote content source 120 is an Internet website that provides downloadable content and/or streaming content. The content provided by the remote content source 120 can include any type of multimedia content, such as movies, games, static/dynamic content, pictures, social media content, social media websites, etc. In some embodiments, content data is transmitted from the remote content sources 120 to the computer system 106, where the content data is then rendered by the computer system 106 in a format suitable for use by the head mounted display 102, followed by transmission of the rendered content from the computer system 106 through the wired link 104 to the head mounted display 102.

In some embodiments, the user 100 may operate a controller (not shown) to provide input commands to the computer system 106. Also, in some embodiments, a camera 108 is configured to capture images of the environment in which the user 100 is located. The camera 108 is connected to the computer system 106 as indicated by link 109. The computer system 106 may operate to analyze the images captured by the camera 108 to determine the location and movements of the user 100, the head mounted display 102, and/or the controller. As discussed with regard to FIG. 1B, the head mounted display 102 may include one or more lights which can be used as markers to facilitate tracking of the head mounted display 102 through analysis of the images captured by the camera 108. Also, in some embodiments, the camera 108 can be configured to include multiple image capture devices, such as a stereoscopic pair of cameras, an infrared camera, a depth camera, or combinations thereof. In some embodiments, one or microphones (not shown) can be used to capture sound from the user 100 and/or from the environment in which the user 100 is located, for processing by the computer system 106.

In some embodiments, the computer system 106 is configured to execute games locally on the processing hardware of the computer system 106. The games or content can be obtained in any form, such as physical media form (e.g., digital discs, tapes, cards, thumb drives, solid state chips or cards, etc.) or by way of download from the Internet, via network 110. In some embodiments, the computer system 106 functions as a client in communication over the network 110 with the cloud gaming infrastructure 112. The cloud gaming infrastructure 112 may maintain and execute the video game being played by the user 100. The computer system 106 can be defined to transmit inputs received from the head mounted display 102, the controller, and the camera 108, to the cloud gaming infrastructure 112, which processes the inputs to affect the game state of the executing video game.

In some embodiments, the head mounted display 102, controller, and camera 108, may themselves be networked devices that connect to the network 110 to communicate with the cloud gaming infrastructure 112. For example, the computer system 106 may be a local network device, such as a router, that does not otherwise perform video game processing, but facilitates passage of network traffic. The connections to the network 110 by the head mounted display 102, the controller, and the camera 108 may be wired or wireless.

Game data from the executing video game, such as video data, audio data, and tactile feedback data, can be transmitted from the cloud gaming infrastructure 112 and/or content sources 120 to the computer system 106. The computer system 106 may further process the game data before transmission to the appropriate device, or may directly transmit the game data to the appropriate device. For example, video and audio streams may be transmitted to the head mounted display 102, whereas a vibration feedback command may be transmitted to the controller.

Figure 1B:
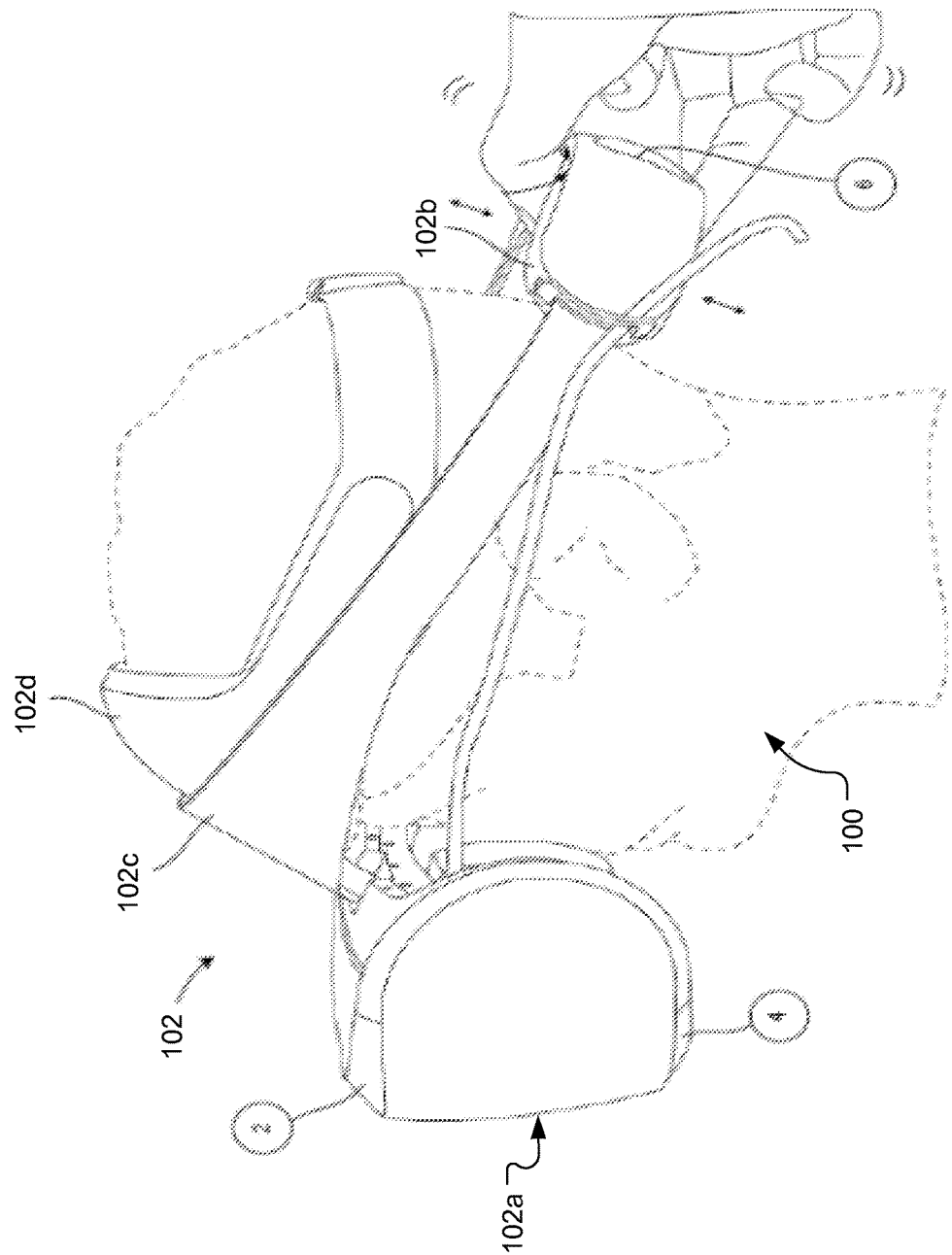
FIG. 1B shows an example head mounted display worn by the user for viewing and/or interacting with multimedia content, in accordance with an example embodiment of the present invention.

FIG. 1B shows an example head mounted display 102 worn by the user 100 for viewing and/or interacting with multimedia content, in accordance with an example embodiment of the present invention. The head mounted display 102 allows the user 100 to view rich multimedia content, including interactive scenes from video games, scenes from movies, Internet content, and other types of interactive and non-interactive content. The tracking of position and movement (including orientation, location, direction, etc.) of the head mounted display 102 is enabled by inertial sensors onboard the head mounted display 102 and by tracking a plurality of marker elements, such as light emitting diodes, infra-red markers, visual marker elements, etc., distributed across different external surfaces of the head mounted display 102, using a combination of sensors or based on one or more variables used to define a volume surrounding the head mounted display 102. Some of the sensors used for tracking include, without limitation, inertial sensors within the head mounted display 102 that allow movement tracking of the head mounted display 102, one or more image sensors and one or more depth sensors, wherein the image sensors and depth sensors allow optical tracking. The tracking using inertial sensors may be enabled using one or more accelerometers and one or more gyroscopes that are disposed within the head mounted display 102.

The image sensors may include one or more single-lens camera, infrared camera, stereo camera, etc. And, depth sensors may include one or more depth sensing cameras, ultrasonic camera, three-dimensional (3D) stereo cameras, video cameras, etc. The image sensors and depth sensors encompass one or more cameras provided within the head mounted display 102 as well as external cameras that are dispersed within a real-world environment of the user 100 wearing the head mounted display 102, such as camera 108. The image sensors and/or the depth sensors within the head mounted display 102, for example, are used to capture images/videos of the real-world objects/scenes in the immediate vicinity of the user 100 from the perspective of the user 100 wearing the head mounted display 102. The captured images/videos may be rendered in the display portion of the head mounted display 102 when content is being generated.

Also, the captured images/video can be presented to the user 100 on the display of the head mounted display 102 to provide the user 100 with a "video see-through" ability while wearing the head mounted display 102. That is, though the user 100 cannot see through the head mounted display 102 in a strict sense, the video captured by the image capture devices of the head mounted display 102 can nonetheless provide a functional equivalent of being able to see the environment external to the head mounted display 102 as if the head mounted display 102 were transparent. Such video can be augmented with virtual elements to provide an augmented reality experience, or may be combined or blended with virtual elements in other ways. For ease of description, the term "virtual reality scene" as used herein refers to a display of video within the head mounted display 102 that is either a completely computer generated virtual reality scene or an augmented reality scene.

The image and/or depth sensors distributed externally within the scene of the user 100, for example, are configured to capture images/videos of the various markers, such as lights, light emitting diodes (LEDs), infra-red markers, etc., distributed across the external surface of the head mounted display 102. In one embodiment, the images/videos are transmitted to the computer system 106 where the images/video frames are analyzed to accurately determine the location of the head mounted display 102. Additionally, the images/videos can be analyzed within the computer processing capability of the head mounted display 102 to determine the location, orientation, direction of the head mounted display 102 with reference to other objects in the real-world scene.

In one configuration, the head mounted display 102 includes LEDs (for example, represented by bubbles 2, 4 and 6 in FIG. 1B) disposed at strategic locations on one or more external surfaces of the head mounted display 102. For instance, the LEDs may be disposed on the four corners of the front block unit 102a (e.g., also referred to as the optics block) of the head mounted display 102 and two on the rear/back section 102b of the head mounted display 102. In some embodiments, the rear/back section 102b is disposed on an adjustable band unit. The head mounted display 102 may also include other surfaces, such as 102c and 102d to allow the user to safely and securely position the head mounted display 102 on the head of the user 100. In some embodiments, the front LEDs are configured to be partially disposed on the front surface of the front block unit 102a and partially on side surfaces of the front block unit 102a that are disposed on each side of the front surface, to define a partial L-shape, a curved L-shape, a boomerang shape, a curved rectangle, a curved line, a spot, a circle, a pattern, or combinations thereof. The markers are not restricted to LEDs but can also include lights, infra-red markers, color coded markers, reflective markers, etc.

The analysis of the images/video frames are used to compute relative distance of the different markers of the head mounted display 102 from one another and from one or more reference points. The computed distances are used to determine a volume around the head mounted display 102 and changes to the volume during use to more accurately define the position of the head mounted display 102. Additionally, in some embodiments, the video frames/images captured by the various sensors are analyzed to assist in determining position of the various makers in terms of orientation, location, and direction of movement in order to more accurately determine the direction of movement or position of the user 100 wearing the head mounted display 102.

Also, as discussed herein, the inertial sensors onboard the head mounted display 102 generate inertial sensor data that can be analyzed/processed to determine the position, direction of movement, and rate of movement of the head mounted display 102, in order to determine an action and/or gesture made by the user 100 as an input to the application executing to generate the virtual reality scene displayed in the head mounted display 102. In some embodiments, the inertial sensors can be used without the other markers of the head mounted display 102 to determine the position, direction of movement, and rate of movement of the head mounted display 102. In some embodiments, the inertial sensors can be used in combination with the other markers of the head mounted display 102 to determine the position, direction of movement, and rate of movement of the head mounted display 102.

In some embodiments, the head mounted display 102 is configured to provide a view into an interactive virtual reality scene of a computer application. For example, some computer applications that may support virtual reality scene generation and display through the head mounted display 102 include games (such as first person shooter games), virtual tours (such as hotels, travel sites, global placed of interest, augmented reality applications (such as for virtual meetings, collaboration between remote users, shared/synchronized virtual spaces), and augmented reality medical applications (such as remote examination, examination assistance, remote surgery, remote surgery assistance), among others. In the various computer applications, the user 100 wearing the head mounted display 102 will be able to move their head in any direction to view other parts of the virtual reality scene. And, in the case of an interactive virtual reality scene, movement of the head mounted display 102 by way of movement of the user's head can be used to provide inputs to control movement of the user and/or other objects within the virtual reality scene, and/or take other actions within the virtual reality scene, such as zooming a view of the user in and out relative to an object present within the virtual reality scene.

Because the interactive content that can be rendered in the virtual reality scene in the head mounted display 102 is virtually boundless, a user is able to view and interact with the virtual reality scene in most every dimension. Tracking of the user's movement can include the use of the inertial sensors that are disposed within the head mounted display 102. The inertial sensors can include one or more accelerometers (such as a MEMS inertial accelerometer, among others) and/or one or more gyroscopes (such as a ring laser gyroscope, a fiber optic gyroscope, a MEMS gyroscope, among others). Some implementations of the head mounted display 102 may include more or less inertial sensors.

For ease of description, the term "inertial sensor" as used herein refers to any type of inertial sensor that is capable of detecting/sensing movement of itself without an external reference. The inertial sensor generates inertial sensor data that provides information about the direction and rate of movement of the inertial sensor. With the inertial sensors fixed within the head mounted display 102, the inertial sensor data can be analyzed to determine the direction and rate of movement of the head mounted display 102, which in turn can be analyzed to determine the direction and rate of movement of the user 100 wearing the head mounted display 102. In this manner, movements of the user as determined through analysis of the inertial sensor data can be used as inputs to the computer application executing to generate and render the virtual reality scene.

Therefore, through analysis of the inertial sensor data, the user is able to act as a human controller to affect specific actions within the interactive virtual reality scene. And, in some embodiments, the movements of the user and corresponding actions within the virtual reality scene can be naturally related to each other. For example, inertial sensor data indicating a lean forward by the user may be used by the computer application as an input to cause the user's viewpoint to move forward within the virtual reality scene. It should be appreciated that the types of user movement and corresponding actions within the virtual reality scene are essentially limitless, depending on the range of possible movements of the human body and the context of any given virtual reality scene.

Figure 2A:
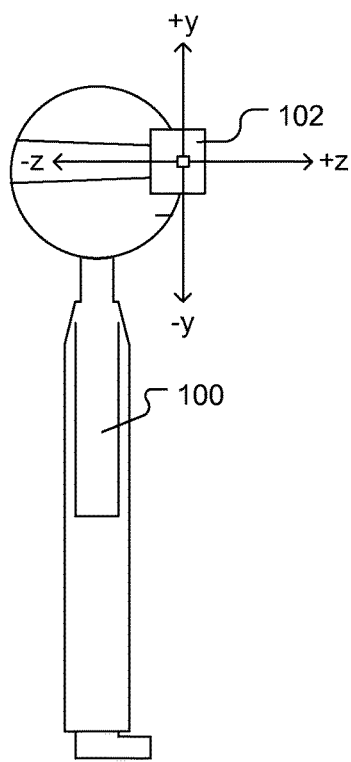
FIG. 2A shows a side view of the user wearing the head mounted display, with the user in a home position relative to a reference Cartesian coordinate system defined by x, y, z axes, in accordance with an example embodiment of the present invention.
Figure 2B:
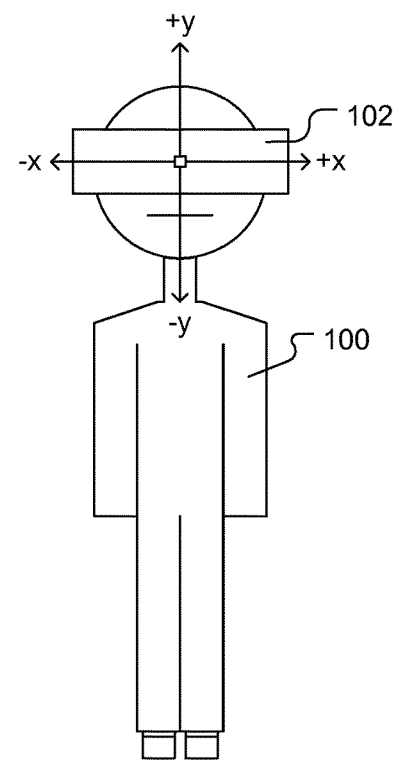
FIG. 2B shows a front view of the user wearing the head mounted display, with the user in the home position relative to the reference Cartesian coordinate system defined by x, y, z axes, in accordance with an example embodiment of the present invention.

FIG. 2A shows a side view of the user 100 wearing the head mounted display 102, with the user in a home position relative to a reference Cartesian coordinate system defined by x, y, z axes, in accordance with an example embodiment of the present invention. FIG. 2B shows a front view of the user 100 wearing the head mounted display 102, with the user in the home position relative to the reference Cartesian coordinate system defined by x, y, z axes, in accordance with an example embodiment of the present invention.

Figure 3A:
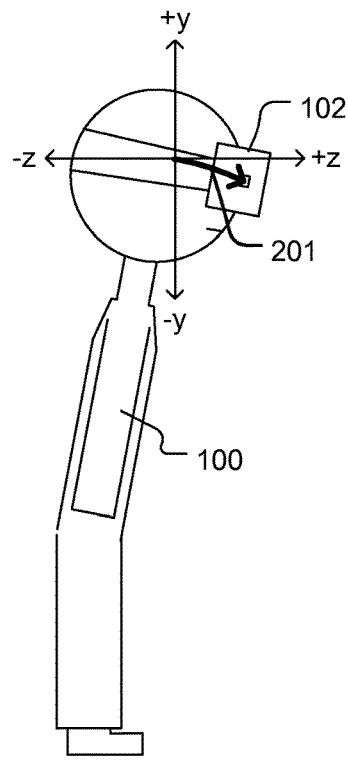
FIG. 3A shows a forward lean movement of the user from the home position, in accordance with an example embodiment of the present invention.

FIG. 3A shows a forward lean movement of the user 100 from the home position, in accordance with an example embodiment of the present invention. The forward lean movement of the user 100 causes the inertial sensor(s) onboard the head mounted display 102 to generate inertial sensor data that when analyzed reveals the forward lean direction of movement as indicated by arrow 201. The forward lean direction of movement, as determined through analysis of the inertial sensor data, can be used to affect an action within the virtual reality scene displayed in the head mounted display 102, such as causing a viewpoint of the user or virtual object under control of the user to move forward, or causing a stoppage of backward movement of a viewpoint of the user or virtual object under control of the user, or causing a view of the user to zoom in on a particular object or point within the virtual reality scene, among other possible actions commensurate with the context of the virtual reality scene that is currently displayed to the user 100 within the head mounted display 102.

Figure 3B:
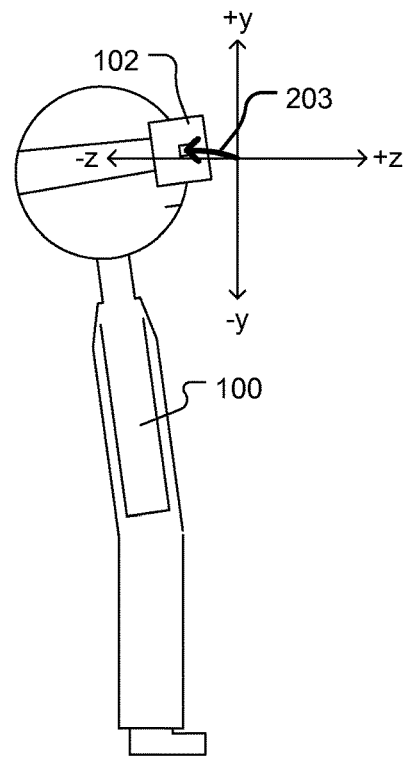
FIG. 3B shows a backward lean movement of the user from the home position, in accordance with an example embodiment of the present invention.

FIG. 3B shows a backward lean movement of the user 100 from the home position, in accordance with an example embodiment of the present invention. The backward lean movement of the user 100 causes the inertial sensor(s) onboard the head mounted display 102 to generate inertial sensor data that when analyzed reveals the backward lean direction of movement as indicated by arrow 203. The backward lean direction of movement, as determined through analysis of the inertial sensor data, can be used to affect an action within the virtual reality scene displayed in the head mounted display 102, such as causing a stoppage of forward movement of a viewpoint of the user or virtual object under control of the user, or causing a viewpoint of the user or virtual object under control of the user to move backward, or causing a view of the user to zoom out from a particular object or point within the virtual reality scene, among other possible actions commensurate with the context of the virtual reality scene that is currently displayed to the user 100 within the head mounted display 102.

Figure 3C:
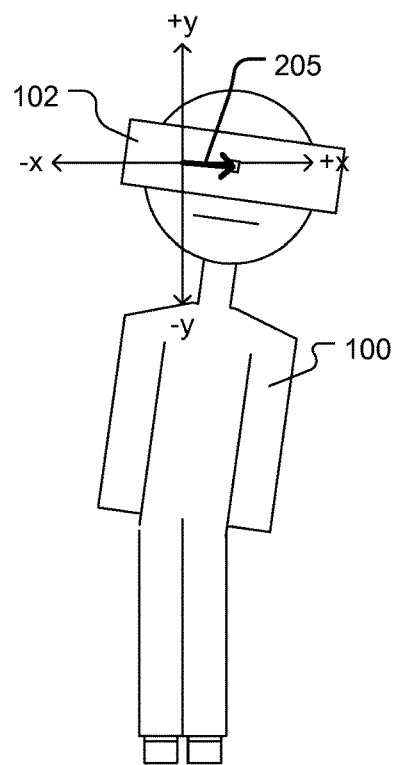
FIG. 3C shows a left lean movement of the user from the home position, in accordance with an example embodiment of the present invention.

FIG. 3C shows a left lean movement of the user 100 from the home position, in accordance with an example embodiment of the present invention. The left lean movement of the user 100 causes the inertial sensor(s) onboard the head mounted display 102 to generate inertial sensor data that when analyzed reveals the left lean direction of movement as indicated by arrow 205. The left lean direction of movement, as determined through analysis of the inertial sensor data, can be used to affect an action within the virtual reality scene displayed in the head mounted display 102, such as causing a stoppage of rightward movement of a viewpoint of the user or virtual object under control of the user, or causing a viewpoint of the user or virtual object under control of the user to move left, or causing a view of the user or virtual object under control of the user to tilt left, among other possible actions commensurate with the context of the virtual reality scene that is currently displayed to the user 100 within the head mounted display 102.

Figure 3D:
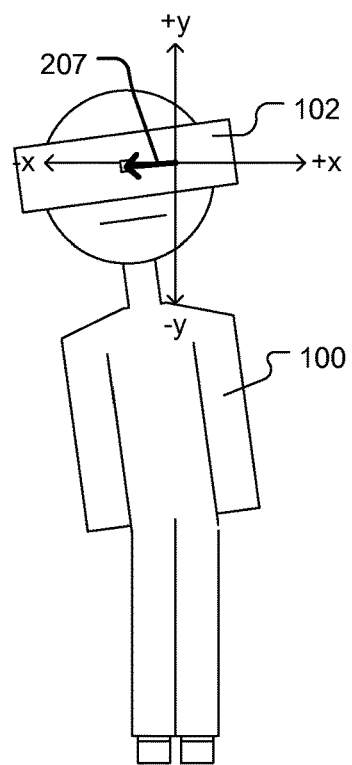
FIG. 3D shows a right lean movement of the user from the home position, in accordance with an example embodiment of the present invention.

FIG. 3D shows a right lean movement of the user 100 from the home position, in accordance with an example embodiment of the present invention. The right lean movement of the user 100 causes the inertial sensor(s) onboard the head mounted display 102 to generate inertial sensor data that when analyzed reveals the right lean direction of movement as indicated by arrow 207. The right lean direction of movement, as determined through analysis of the inertial sensor data, can be used to affect an action within the virtual reality scene displayed in the head mounted display 102, such as causing a stoppage of leftward movement of a viewpoint of the user or virtual object under control of the user, or causing a viewpoint of the user or virtual object under control of the user to move right, or causing a view of the user or virtual object under control of the user to tilt right, among other possible actions commensurate with the context of the virtual reality scene that is currently displayed to the user 100 within the head mounted display 102.

Figure 3E:
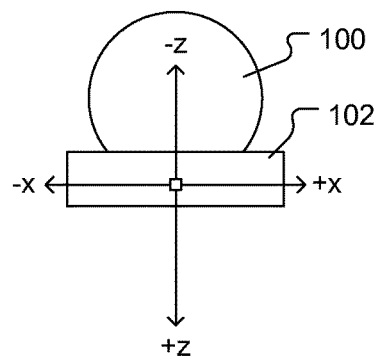
FIG. 3E shows a top view of the user wearing the head mounted display, with the user in the home position relative to the reference Cartesian coordinate system defined by x, y, z axes, in accordance with an example embodiment of the present invention.
Figure 3F:
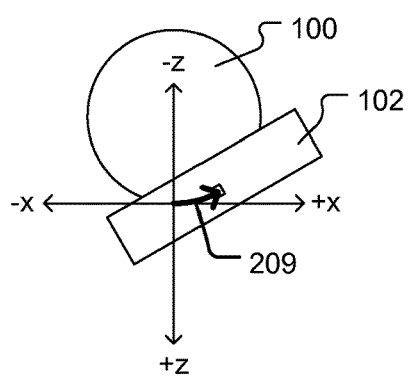
FIG. 3F shows a left head turn movement of the user from the home position, in accordance with an example embodiment of the present invention.

FIG. 3E shows a top view of the user 100 wearing the head mounted display 102, with the user in the home position relative to the reference Cartesian coordinate system defined by x, y, z axes, in accordance with an example embodiment of the present invention. FIG. 3F shows a left head turn movement of the user 100 from the home position, in accordance with an example embodiment of the present invention. The left head turn movement of the user 100 causes the inertial sensor(s) onboard the head mounted display 102 to generate inertial sensor data that when analyzed reveals the left head turn direction of movement as indicated by arrow 209. The left head turn direction of movement, as determined through analysis of the inertial sensor data, can be used to affect an action within the virtual reality scene displayed in the head mounted display 102, such as causing a stoppage of right turn movement of a viewpoint of the user or virtual object under control of the user, or causing a viewpoint of the user or virtual object under control of the user to turn left, or causing a view of the user to pan left, among other possible actions commensurate with the context of the virtual reality scene that is currently displayed to the user 100 within the head mounted display 102.

Figure 3G:
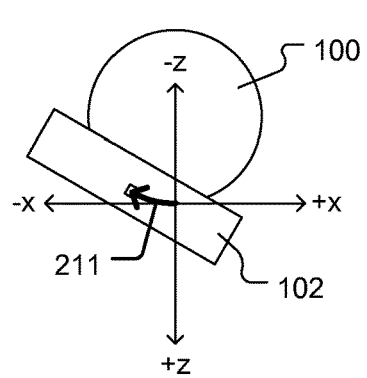
FIG. 3G shows a right head turn movement of the user from the home position, in accordance with an example embodiment of the present invention.

FIG. 3G shows a right head turn movement of the user 100 from the home position, in accordance with an example embodiment of the present invention. The right head turn movement of the user 100 causes the inertial sensor(s) onboard the head mounted display 102 to generate inertial sensor data that when analyzed reveals the right head turn direction of movement as indicated by arrow 211. The right head turn direction of movement, as determined through analysis of the inertial sensor data, can be used to affect an action within the virtual reality scene displayed in the head mounted display 102, such as causing a stoppage of left turn movement of a viewpoint of the user or virtual object under control of the user, or causing a viewpoint of the user or virtual object under control of the user to turn right, or causing a view of the user to pan right, among other possible actions commensurate with the context of the virtual reality scene that is currently displayed to the user 100 within the head mounted display 102.

Figure 3H:
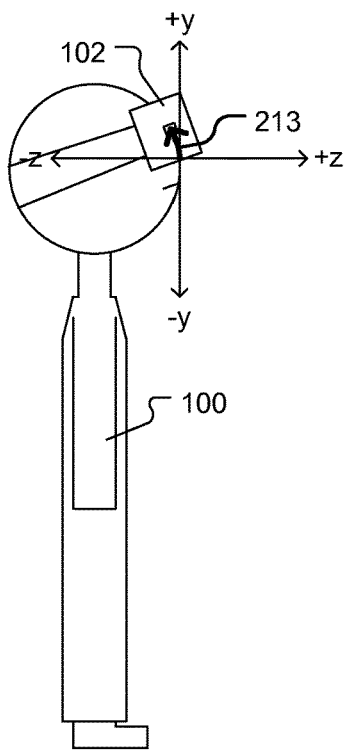
FIG. 3H shows upward head tilt movement of the user from the home position, in accordance with an example embodiment of the present invention.

FIG. 3H shows upward head tilt movement of the user 100 from the home position, in accordance with an example embodiment of the present invention. The upward head tilt movement of the user 100 causes the inertial sensor(s) onboard the head mounted display 102 to generate inertial sensor data that when analyzed reveals the upward head tilt direction of movement as indicated by arrow 213. The upward head tilt direction of movement, as determined through analysis of the inertial sensor data, can be used to affect an action within the virtual reality scene displayed in the head mounted display 102, such as causing a stoppage of downward movement of a viewpoint of the user or virtual object under control of the user, or causing a viewpoint of the user or virtual object under control of the user to turn upward, or causing a view of the user to pan upward, among other possible actions commensurate with the context of the virtual reality scene that is currently displayed to the user 100 within the head mounted display 102.

Figure 3I:
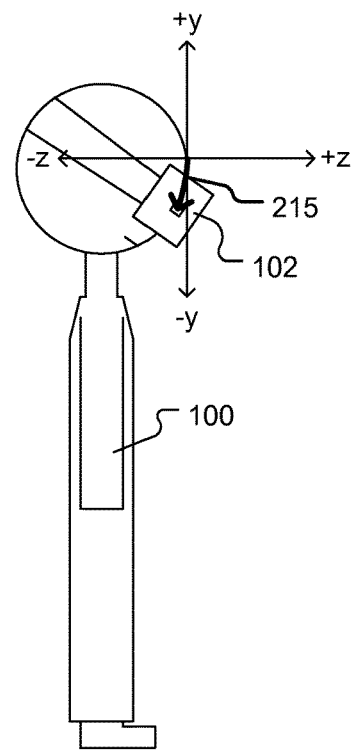
FIG. 3I shows downward head tilt movement of the user from the home position, in accordance with an example embodiment of the present invention.

FIG. 3I shows downward head tilt movement of the user 100 from the home position, in accordance with an example embodiment of the present invention. The downward head tilt movement of the user 100 causes the inertial sensor(s) onboard the head mounted display 102 to generate inertial sensor data that when analyzed reveals the downward head tilt direction of movement as indicated by arrow 215. The downward head tilt direction of movement, as determined through analysis of the inertial sensor data, can be used to affect an action within the virtual reality scene displayed in the head mounted display 102, such as causing a stoppage of upward movement of a viewpoint of the user or virtual object under control of the user, or causing a viewpoint of the user or virtual object under control of the user to turn downward, or causing a view of the user to pan downward, among other possible actions commensurate with the context of the virtual reality scene that is currently displayed to the user 100 within the head mounted display 102.

Figure 3J:
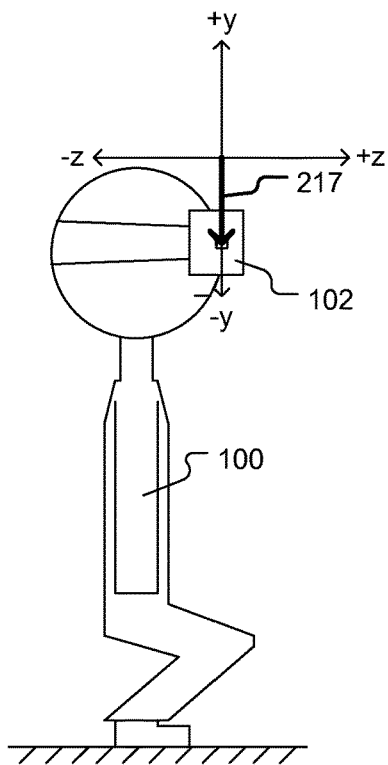
FIG. 3J shows downward movement of the user from the home position, in accordance with an example embodiment of the present invention.

FIG. 3J shows downward movement of the user 100 from the home position, in accordance with an example embodiment of the present invention. The downward movement of the user 100 causes the inertial sensor(s) onboard the head mounted display 102 to generate inertial sensor data that when analyzed reveals the downward direction of movement as indicated by arrow 217. The downward direction of movement, as determined through analysis of the inertial sensor data, can be used to affect an action within the virtual reality scene displayed in the head mounted display 102, such as causing a stoppage of upward movement of a viewpoint of the user or virtual object under control of the user, or causing a viewpoint of the user or virtual object under control of the user to move downward, or causing the viewpoint of the user or virtual object under control of the user to assume a resting state within the virtual reality scene, or causing a selection action to occur, among other possible actions commensurate with the context of the virtual reality scene that is currently displayed to the user 100 within the head mounted display 102.

Figure 3K:
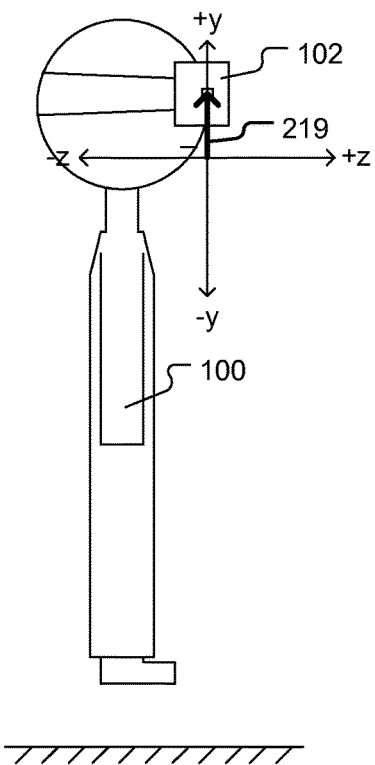
FIG. 3K shows upward movement of the user from the home position, in accordance with an example embodiment of the present invention.

FIG. 3K shows upward movement of the user 100 from the home position, in accordance with an example embodiment of the present invention. The upward movement of the user 100 causes the inertial sensor(s) onboard the head mounted display 102 to generate inertial sensor data that when analyzed reveals the upward direction of movement as indicated by arrow 219. The upward direction of movement, as determined through analysis of the inertial sensor data, can be used to affect an action within the virtual reality scene displayed in the head mounted display 102, such as causing a stoppage of downward movement of a viewpoint of the user or virtual object under control of the user, or causing a viewpoint of the user or virtual object under control of the user to move upward, or causing the viewpoint of the user or virtual object under control of the user to perform a jump within the virtual reality scene, among other possible actions commensurate with the context of the virtual reality scene that is currently displayed to the user 100 within the head mounted display 102.

Figure 3L:
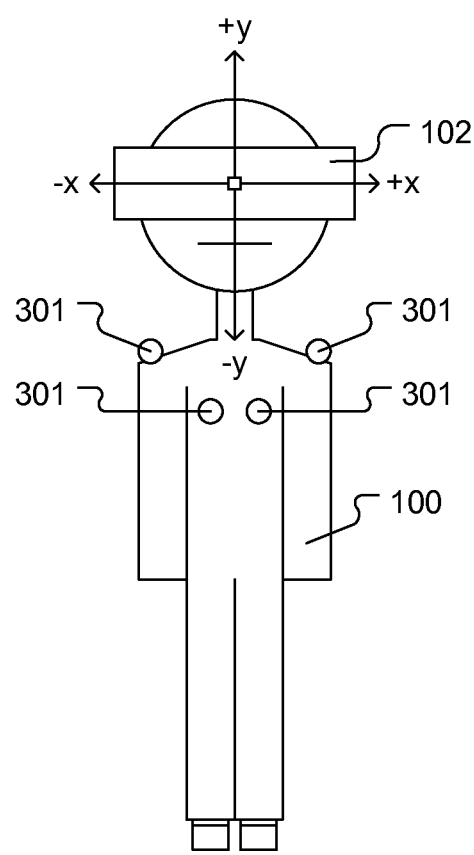
FIG. 3L shows the front view of the user wearing the head mounted display, with the user in the home position relative to the reference Cartesian coordinate system defined by x, y, z axes, and with additional inertial sensors located on a body of the user external to the head mounted display, in accordance with an example embodiment of the present invention.

FIG. 3L shows the front view of the user 100 wearing the head mounted display 102, with the user in the home position relative to the reference Cartesian coordinate system defined by x, y, z axes, and with additional inertial sensors 301 located on a body of the user 100 external to the head mounted display 102, in accordance with an example embodiment of the present invention. In this embodiment, signals from the additional inertial sensors 301 located on a body of the user 100 external to the head mounted display 102 can be processed in conjunction with signals received from the inertial sensor(s) onboard the head mounted display 102 to facilitate determination of a specific kind of movement being performed by the user 100. For example, when the inertial sensor(s) onboard the head mounted display 102 indicate a movement in a sideways (left/right) direction, while the inertial sensors 301 on the body of the user 100 do not indicate a movement in the sideways direction, the movement in the sideways direction as indicated by the inertial sensor(s) onboard the head mounted display 102 can be interpreted as corresponding to sideways head tilting motion, as opposed to a sideways leaning motion. Similarly, in another example, when the inertial sensor(s) onboard the head mounted display 102 indicate a movement in a sideways (left/right) direction, while the inertial sensors 301 on the body of the user 100 also indicate a movement in the sideways direction, the movement in the sideways direction as indicated by the inertial sensor(s) onboard the head mounted display 102 can be interpreted as corresponding to sideways leaning motion, as opposed to a sideways tilting motion.

In another example, when the inertial sensor(s) onboard the head mounted display 102 indicate a movement in a forward direction, while the inertial sensors 301 on the body of the user 100 do not indicate a movement in the forward direction, the movement in the forward direction as indicated by the inertial sensor(s) onboard the head mounted display 102 can be interpreted as corresponding to forward head tilting motion, as opposed to a forward leaning motion. Similarly, in another example, when the inertial sensor(s) onboard the head mounted display 102 indicate a movement in a forward direction, while the inertial sensors 301 on the body of the user 100 also indicate a movement in the forward direction, the movement in the forward direction as indicated by the inertial sensor(s) onboard the head mounted display 102 can be interpreted as corresponding to forward leaning motion, as opposed to a forward head tilting motion.

In another example, when the inertial sensor(s) onboard the head mounted display 102 indicate a movement in a backward direction, while the inertial sensors 301 on the body of the user 100 do not indicate a movement in the backward direction, the movement in the backward direction as indicated by the inertial sensor(s) onboard the head mounted display 102 can be interpreted as corresponding to backward head tilting motion, as opposed to a backward leaning motion. Similarly, in another example, when the inertial sensor(s) onboard the head mounted display 102 indicate a movement in a backward direction, while the inertial sensors 301 on the body of the user 100 also indicate a movement in the backward direction, the movement in the backward direction as indicated by the inertial sensor(s) onboard the head mounted display 102 can be interpreted as corresponding to backward leaning motion, as opposed to a backward head tilting motion.

In another example, when the inertial sensor(s) onboard the head mounted display 102 indicate a movement in a rotational direction (rotation to the left or right), while the inertial sensors 301 on the body of the user 100 do not indicate a movement in the rotational direction, the movement in the rotational direction as indicated by the inertial sensor(s) onboard the head mounted display 102 can be interpreted as corresponding to head turning motion in the rotational direction, as opposed to a body turning motion in the rotational direction. In another example, when the inertial sensor(s) onboard the head mounted display 102 indicate a movement in a first rotational direction, while the inertial sensors 301 on the body of the user 100 indicate a movement in a second rotational direction opposite that of the first rotational direction, the opposing rotational movements as indicated by the inertial sensor(s) onboard the head mounted display 102 relative to the inertial sensor on the body of the user 100 can be interpreted as corresponding to counter rotational motions, such as a windup motion or the like.

It should be understood that the particular number and locations of the inertial sensors 301 on the body of the user 100 as depicted in FIG. 3L are provided by way of example. In various embodiments, the number and locations of the inertial sensors 301 on the body of the user 100 can vary as needed so as to provide signals representative of body motion for comparison with signals generated by the inertial sensor(s) onboard the head mounted display 102 in order to discern specific movements of the user 100.

It should be understood that the particular user 100 movements described with regard to FIGS. 3A-3L are examples of a broader set of possible user 100 movements. Therefore, although the particular user 100 movements described with regard to FIGS. 3A-3L may be considered primary movements, these particular user 100 movements are in no way exhaustive of all possible user 100 movements. Analysis of the inertial sensor data can reveal any direction of user 100 movement that may occur, including the particular user 100 movements depicted in FIGS. 3A-3L and any direction of user 100 movement therebetween. Also, any action within the virtual reality scene that is commensurate with the context of the virtual reality scene can be correlated to any user 100 movement detectable through analysis of the inertial sensor data received from the inertial sensors within the head mounted display 102.

Figure 4:
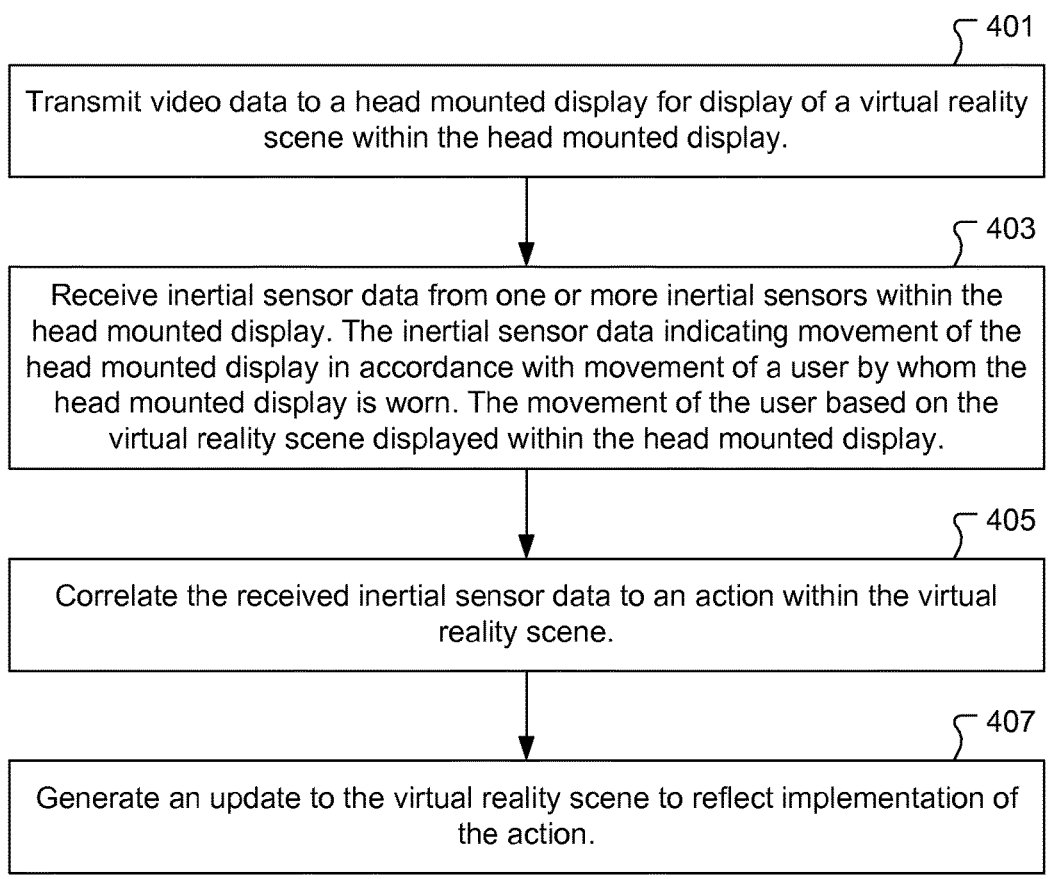
FIG. 4 shows a flowchart of a method for operating a computer system to generate video data for a virtual reality scene based on inertial sensor data received from a head mounted display, in accordance with an example embodiment of the present invention.

FIG. 4 shows a flowchart of a method for operating a computer system to generate video data for a virtual reality scene based on inertial sensor data received from a head mounted display, in accordance with an example embodiment of the present invention. The method includes an operation 401 for transmitting video data to the head mounted display for display of a virtual reality scene within the head mounted display. The method also includes an operation 403 for receiving inertial sensor data from one or more inertial sensors within the head mounted display. The inertial sensor data indicates movement of the head mounted display in accordance with movement of a user by whom the head mounted display is worn. The movement of the user is based on the virtual reality scene displayed within the head mounted display. The method also includes an operation 405 for correlating the received inertial sensor data to an action within the virtual reality scene. The method also includes an operation 407 for generating an update to the virtual reality scene to reflect implementation of the action. The update to the virtual reality scene is video data reflecting the virtual reality scene after processing of the action that is correlated to the received inertial sensor data.

In some embodiments, the correlating of operation 405 includes determining a route of movement of the head mounted display and determining a rate of movement of the head mounted display. In some embodiments, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. However, in other embodiments, the route of movement of the head mounted display may correspond to essentially any user movement within the movement capabilities of the human body.

The correlating of operation 405 can also include determining a set of allowable virtual movements within a current context of the virtual reality scene. The correlating of operation 405 can also include mapping the route of movement of the head mounted display to a corresponding virtual movement within the set of allowable virtual movements. In some embodiments, mapping the route of movement of the head mounted display to the corresponding virtual movement includes querying a calibration table, where the calibration table defines associations between a number of routes of movement of the head mounted display and resulting actions within the virtual reality scene, i.e., within the current context of the virtual reality scene.

The correlating of operation 405 can also include mapping the rate of movement of the head mounted display to a rate of the corresponding virtual movement within the virtual reality scene, where the virtual movement may be for the viewpoint of the user, or for an object under control of the user, or for some other movement action within the virtual reality scene. In some embodiments, mapping both the route of movement and the rate of movement of the head mounted display to the corresponding virtual movement within the virtual reality scene includes querying a calibration table, where the calibration table defines associations between a number of combinations of routes and rates of movement of the head mounted display and resulting actions within the virtual reality scene.

In some embodiments, the action within the virtual reality scene to which the received inertial sensor data is correlated in operation 405 is a movement of a viewpoint of the user within the virtual reality scene. In some embodiments, the action within the virtual reality scene to which the received inertial sensor data is correlated in operation 405 is a change in direction of a viewpoint of the user within the virtual reality scene. In some embodiments, the action within the virtual reality scene to which the received inertial sensor data is correlated in operation 405 is a zoom-in or a zoom-out of a viewpoint of the user within the virtual reality scene. In some embodiments, the action within the virtual reality scene to which the received inertial sensor data is correlated in operation 405 is a movement of an object displayed within the virtual reality scene. However, regardless of specific embodiments, it should be understood that the action within the virtual reality scene to which the received inertial sensor data is correlated in operation 405 can be essentially any type of action commensurate with the current context of the virtual reality scene as displayed to the user within the head mounted display.

In some embodiments where the correlating of operation 405 includes determining the set of allowable virtual movements within the current context of the virtual reality scene, the correlating of operation 405 can also include determining that the route of movement of the head mounted display does not corresponding to any virtual movement within the set of allowable virtual movements. In these embodiments, the method can include an optional operation to transmit a feedback signal to the head mounted display, where the feedback signal notifies the user that the movement of the head mounted display does not correspond to any virtual movement within the set of allowable virtual movements.

The method of FIG. 4 can also include an optional operation of receiving inertial sensor data from one or more external inertial sensors positioned on the body of the user who is wearing the head mounted display. The external inertial sensor data indicates movement of the user's body. The method can also include an operation for comparing the external inertial sensor data to the inertial sensor data received from the inertial sensors in the head mounted display in order to determine a specific movement made by the user, such as discussed with regard to FIG. 3L. Then, the operation 405 for correlating the received inertial sensor data to an action within the virtual reality scene will take into account the external inertial sensor data received from the one or more external inertial sensors positioned on the body of the user.

Figure 5:
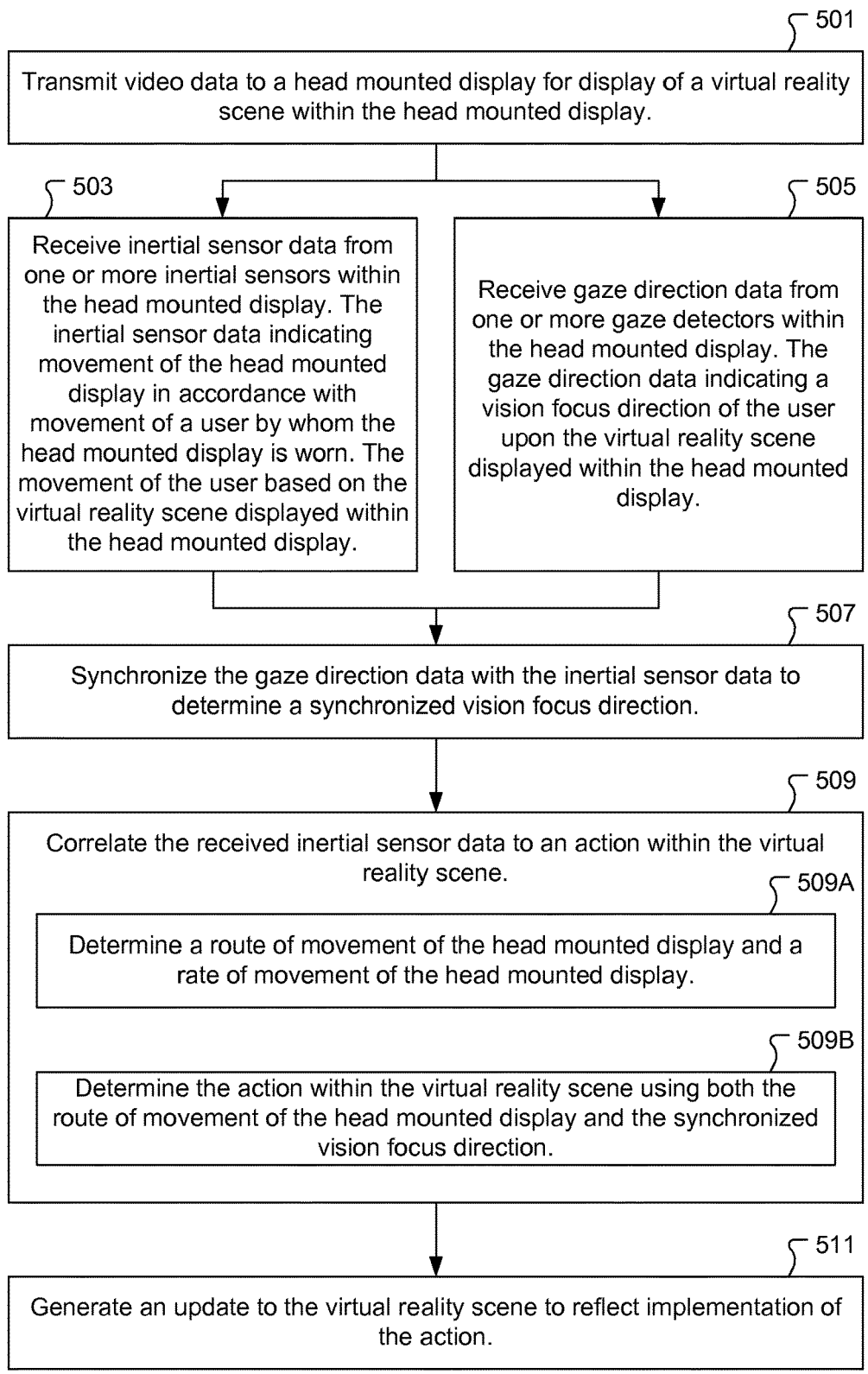
FIG. 5 shows a flowchart of a method for operating a computer system to generate video data for a virtual reality scene based on inertial sensor data and gaze direction data received from a head mounted display, in accordance with an example embodiment of the present invention.

FIG. 5 shows a flowchart of a method for operating a computer system to generate video data for a virtual reality scene based on inertial sensor data and gaze direction data received from a head mounted display, in accordance with an example embodiment of the present invention. The method includes an operation 501 for transmitting video data to the head mounted display for display of a virtual reality scene within the head mounted display. The method also includes an operation 503 for receiving inertial sensor data from one or more inertial sensors within the head mounted display. The inertial sensor data indicates movement of the head mounted display in accordance with movement of a user by whom the head mounted display is worn. The movement of the user is based on the virtual reality scene displayed within the head mounted display.

The method also includes an operation 505 for receiving gaze direction data from one or more gaze detectors within the head mounted display. The gaze detectors are defined to detect the precise locations of the pupils of the user's eyes. The gaze direction data indicates a vision focus direction of the user upon the virtual reality scene displayed within the head mounted display. The method also includes an operation 507 for synchronizing the gaze direction data with the inertial sensor data to determine a synchronized vision focus direction of the user upon the virtual reality scene displayed within the head mounted display. In some embodiments, synchronizing the gaze direction data with the inertial sensor data in operation 507 includes temporal alignment of the gaze direction data with the inertial sensor data, such that the gaze direction data and inertial sensor data correspond to a same instance in time.

The method also includes an operation 509 for correlating the received inertial sensor data to an action within the virtual reality scene. The correlating of operation 509 includes an operation 509A to determine a route of movement of the head mounted display and a rate of movement of the head mounted display based on the received inertial sensor data. The correlating of operation 509 also includes an operation 509B to use both the route of movement of the head mounted display and the synchronized vision focus direction to determine the action within the virtual reality scene. In some embodiments, the synchronized vision focus direction is applied as a directional weighting parameter in determining the action within the virtual reality scene. For example, in some embodiments, a magnitude of the directional weighting parameter is proportional to an amount of time that the synchronized vision focus direction persists in a given direction. It should also be understood that any of the features discussed above with regard to the correlating of operation 405 in the method of FIG. 4 can also be applied in the correlating of operation 509.

The method of FIG. 5 further includes an operation 511 for generating an update to the virtual reality scene to reflect implementation of the action. The update to the virtual reality scene is video data reflecting the virtual reality scene after processing of the action that is correlated to both the received inertial sensor data and the received gaze direction data.

The method of FIG. 5 can also include an optional operation of receiving inertial sensor data from one or more external inertial sensors positioned on the body of the user who is wearing the head mounted display. The external inertial sensor data indicates movement of the user's body. The method can also include an operation for comparing the external inertial sensor data to the inertial sensor data received from the inertial sensors in the head mounted display in order to determine a specific movement made by the user, such as discussed with regard to FIG. 3L. Then, the operation 509 for correlating the received inertial sensor data to an action within the virtual reality scene will take into account the external inertial sensor data received from the one or more external inertial sensors positioned on the body of the user.

Figure 6:
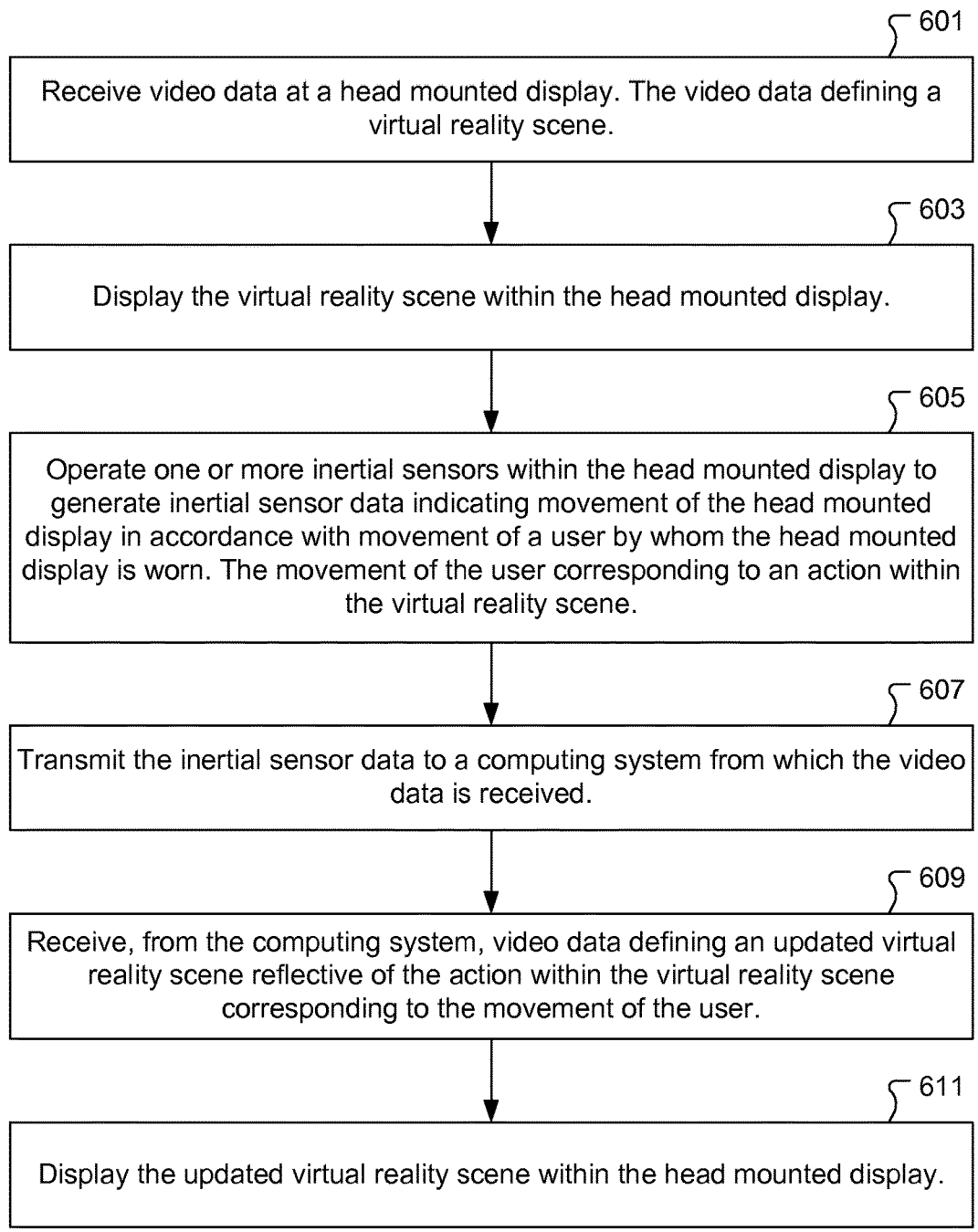
FIG. 6 shows a flowchart of a method for operating a head mounted display in which inertial data signals generated based on user movements are provided as inputs for causing actions within a virtual reality scene, in accordance with an example embodiment of the present invention.

FIG. 6 shows a flowchart of a method for operating a head mounted display in which inertial data signals generated based on user movements are provided as inputs for causing actions within a virtual reality scene, in accordance with an example embodiment of the present invention. The method includes an operation 601 for receiving video data at the head mounted display, where the video data defines a virtual reality scene. The method also includes an operation 603 for displaying the virtual reality scene within the head mounted display, such that the user is able to view the virtual reality scene. The method also includes an operation 605 for operating one or more inertial sensors within the head mounted display to generate inertial sensor data indicating movement of the head mounted display in accordance with movement of the user by whom the head mounted display is worn. The movement of the user corresponds to an action to be performed within the virtual reality scene.

The inertial sensor data provides for determination of a route of movement of the head mounted display and determination of a rate of movement of the head mounted display. In some embodiments, the route of movement of the head mounted display and the rate of movement of the head mounted display are mapped by the computing system to a corresponding virtual movement within a set of allowable virtual movements within a current context of the virtual reality scene. In some embodiments, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. However, in other embodiments, the route of movement of the head mounted display may correspond to essentially any user movement within the movement capabilities of the human body.

In some embodiments, the action within the virtual reality scene to which the generated inertial sensor data corresponds is a movement of a viewpoint of the user within the virtual reality scene. In some embodiments, the action within the virtual reality scene to which the generated inertial sensor data corresponds is a change in direction of a viewpoint of the user within the virtual reality scene. In some embodiments, the action within the virtual reality scene to which the generated inertial sensor data corresponds is a zoom-in or a zoom-out of a viewpoint of the user within the virtual reality scene. In some embodiments, the action within the virtual reality scene to which the generated inertial sensor data corresponds is a movement of an object displayed within the virtual reality scene. However, regardless of specific embodiments, it should be understood that the action within the virtual reality scene to which the generated inertial sensor data corresponds can be essentially any type of action commensurate with the current context of the virtual reality scene as displayed to the user within the head mounted display.

The method also includes an operation 607 for transmitting the inertial sensor data to a computing system from which the video data is received. The method also includes an operation 609 for receiving, from the computing system, video data defining an updated virtual reality scene reflective of the action within the virtual reality scene corresponding to the movement of the user. The method also includes an operation 611 for displaying the updated virtual reality scene within the head mounted display.

Also, in some embodiments, the method of FIG. 6 can include an optional operation for receiving, from the computing system, a feedback signal indicating that the route of movement of the head mounted display does not have any corresponding virtual movement within the set of allowable virtual movements within the current context of the virtual reality scene. In response to the feedback signal, the user can be notified that the route of movement of the head mounted display does not correspond to a valid action within the current context of the virtual reality scene. In some embodiments, notifying the user of the feedback signal can be performed by operating the head mounted display to provide one or more of an audible signal, a tactile signal, and a visual signal, among others.

The method of FIG. 6 can also include an optional operation of transmitting inertial sensor data from one or more external inertial sensors positioned on the body of the user who is wearing the head mounted display to the computing system from which the video data is received. The external inertial sensor data indicates movement of the user's body. The computing system can then use the external inertial sensor data in combination with the inertial sensor data received from the inertial sensors in the head mounted display in order to determine a specific movement made by the user, such as discussed with regard to FIG. 3L. Then, the video data defining the updated virtual reality scene as received in operation 609 will reflect an action within the virtual scene that is discerned from the combination of the external inertial sensor data and the head mounted display inertial sensor data.

Figure 7:
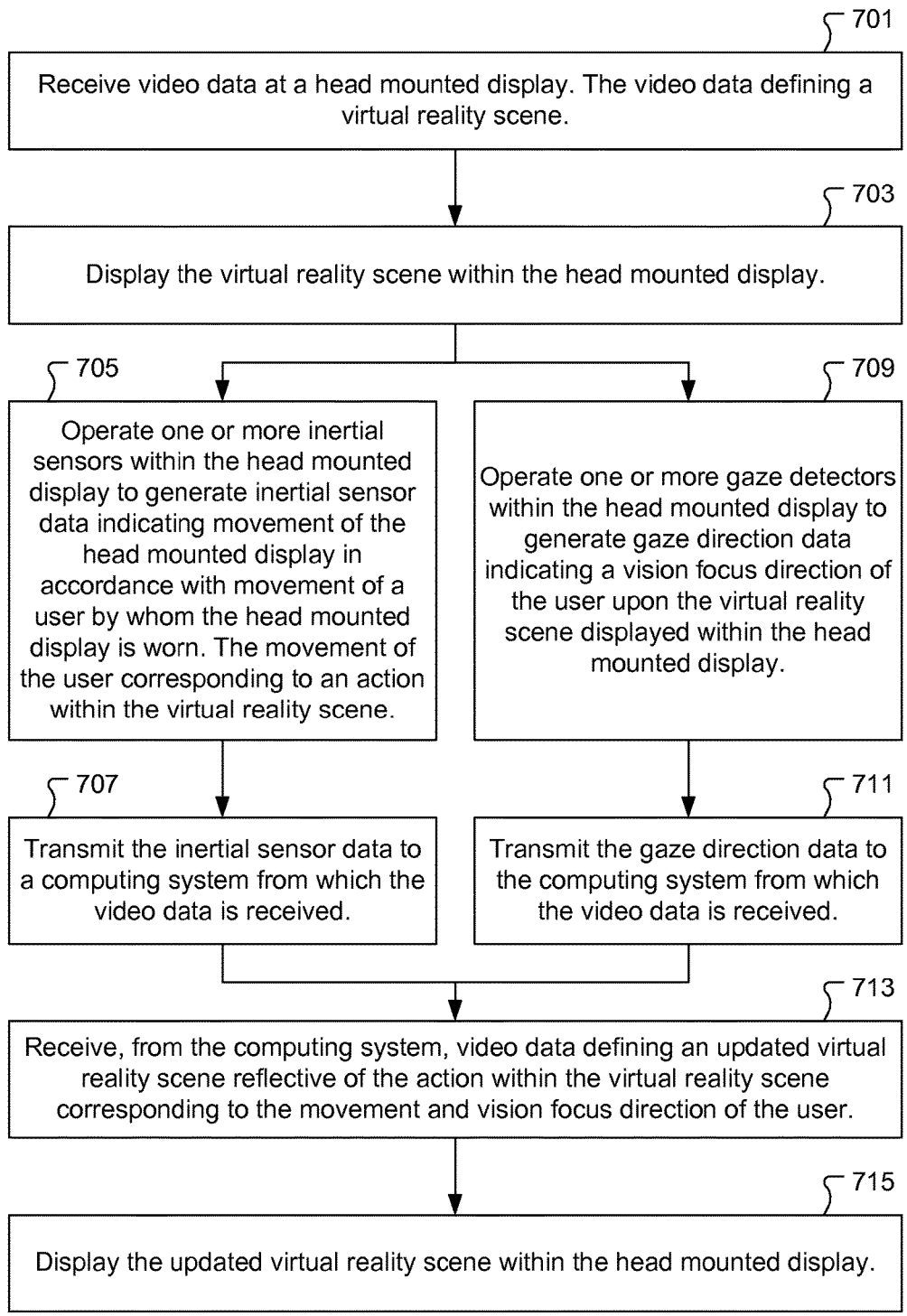
FIG. 7 shows a flowchart of a method for operating a head mounted display in which both inertial data signals generated based on user movements and gaze direction data are provided as inputs for causing actions within a virtual reality scene, in accordance with an example embodiment of the present invention.

FIG. 7 shows a flowchart of a method for operating a head mounted display in which both inertial data signals generated based on user movements and gaze direction data are provided as inputs for causing actions within a virtual reality scene, in accordance with an example embodiment of the present invention. The method includes an operation 701 for receiving video data at the head mounted display, where the video data defines a virtual reality scene. The method also includes an operation 703 for displaying the virtual reality scene within the head mounted display, such that the user is able to view the virtual reality scene. The method also includes an operation 705 for operating one or more inertial sensors within the head mounted display to generate inertial sensor data indicating movement of the head mounted display in accordance with movement of the user by whom the head mounted display is worn. The movement of the user corresponds to an action to be performed within the virtual reality scene. The method also includes an operation 707 for transmitting the inertial sensor data to a computing system from which the video data is received.

The inertial sensor data provides for determination of a route of movement of the head mounted display and determination of a rate of movement of the head mounted display. In some embodiments, the route of movement of the head mounted display and the rate of movement of the head mounted display are mapped by the computing system to a corresponding virtual movement within a set of allowable virtual movements within a current context of the virtual reality scene. In some embodiments, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. However, in other embodiments, the route of movement of the head mounted display may correspond to essentially any user movement within the movement capabilities of the human body.

In some embodiments, the action within the virtual reality scene to which the generated inertial sensor data corresponds is a movement of a viewpoint of the user within the virtual reality scene. In some embodiments, the action within the virtual reality scene to which the generated inertial sensor data corresponds is a change in direction of a viewpoint of the user within the virtual reality scene. In some embodiments, the action within the virtual reality scene to which the generated inertial sensor data corresponds is a zoom-in or a zoom-out of a viewpoint of the user within the virtual reality scene. In some embodiments, the action within the virtual reality scene to which the generated inertial sensor data corresponds is a movement of an object displayed within the virtual reality scene. However, regardless of specific embodiments, it should be understood that the action within the virtual reality scene to which the generated inertial sensor data corresponds can be essentially any type of action commensurate with the current context of the virtual reality scene as displayed to the user within the head mounted display.

The method also includes an operation 709 for operating one or more gaze detectors within the head mounted display to generate gaze direction data indicating a vision focus direction of the user upon the virtual reality scene displayed within the head mounted display. The gaze detectors are defined to detect the precise locations of the pupils of the user's eyes. The method also includes an operation 711 for transmitting the gaze direction data to the computing system from which the video data is received. The gaze direction data is synchronized with the inertial sensor data to determine a synchronized vision focus direction of the user upon the virtual reality scene displayed within the head mounted display. In some embodiments, synchronizing the gaze direction data with the inertial sensor data includes temporal alignment of the gaze direction data with the inertial sensor data, such that the gaze direction data and inertial sensor data correspond to a same instance in time. Both the route of movement of the head mounted display as determined from the inertial sensor data and the synchronized vision focus direction are used to determine the action within the virtual reality scene corresponding to the movement of the user.

The method also includes an operation 713 for receiving, from the computing system, video data defining an updated virtual reality scene reflective of the action within the virtual reality scene corresponding to the movement of the user. The method also includes an operation 715 for displaying the updated virtual reality scene within the head mounted display.

Also, in some embodiments, the method of FIG. 7 can include an optional operation for receiving, from the computing system, a feedback signal indicating that the route of movement of the head mounted display does not have any corresponding virtual movement within the set of allowable virtual movements within the current context of the virtual reality scene. In response to the feedback signal, the user can be notified that the route of movement of the head mounted display does not correspond to a valid action within the current context of the virtual reality scene. In some embodiments, notifying the user of the feedback signal can be performed by operating the head mounted display to provide one or more of an audible signal, a tactile signal, and a visual signal, among others.

The method of FIG. 7 can also include an optional operation of transmitting inertial sensor data from one or more external inertial sensors positioned on the body of the user who is wearing the head mounted display to the computing system from which the video data is received. The external inertial sensor data indicates movement of the user's body. The computing system can then use the external inertial sensor data in combination with the inertial sensor data received from the inertial sensors in the head mounted display in order to determine a specific movement made by the user, such as discussed with regard to FIG. 3L. Then, the video data defining the updated virtual reality scene as received in operation 713 will reflect an action within the virtual scene that is discerned from the combination of the external inertial sensor data and the head mounted display inertial sensor data.

Figure 8:
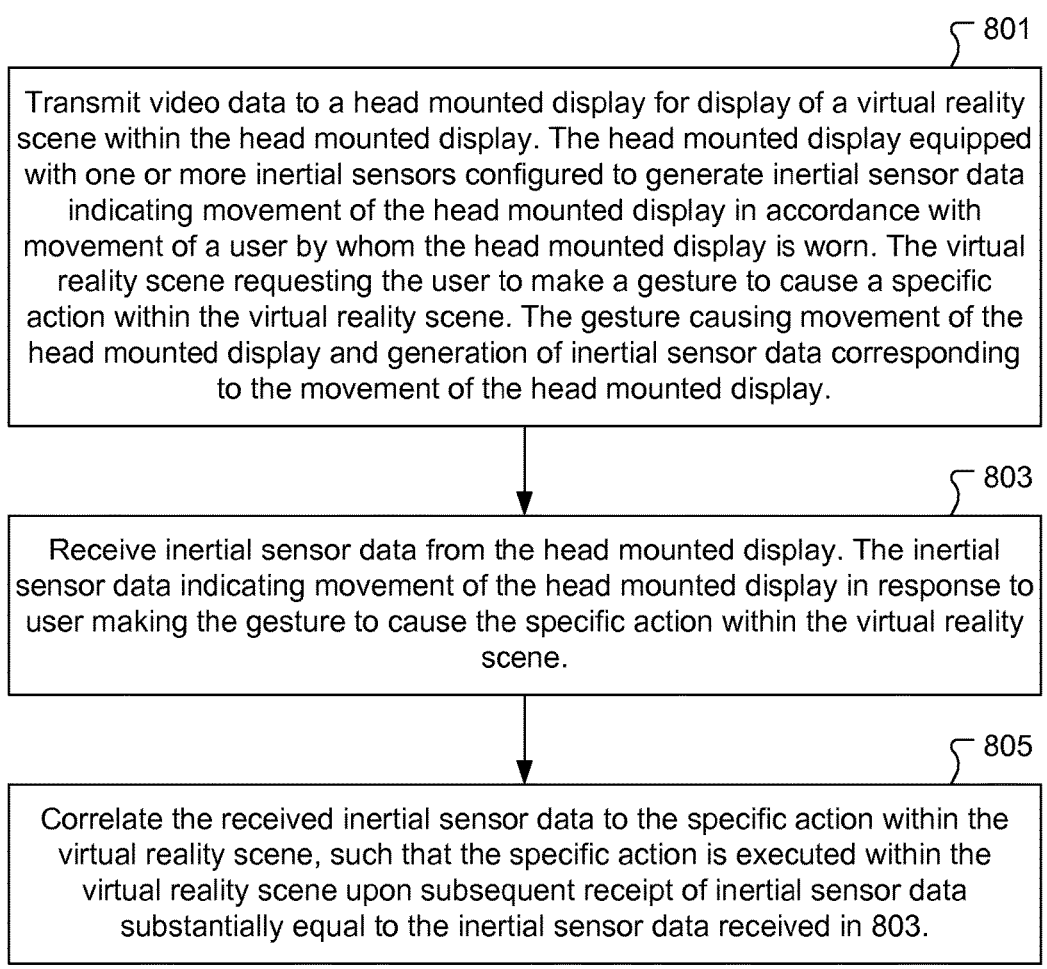
FIG. 8 shows a flowchart of a method for operating a computer system to calibrate actions within a virtual reality scene based on inertial sensor data received from a head mounted display, in accordance with an example embodiment of the present invention.

FIG. 8 shows a flowchart of a method for operating a computer system to calibrate actions within a virtual reality scene based on inertial sensor data received from a head mounted display, in accordance with an example embodiment of the present invention. The method includes an operation 801 for transmitting video data to a head mounted display for display of the virtual reality scene within the head mounted display, such that a user wearing the head mounted display is able to view the virtual reality scene. The head mounted display is equipped with one or more inertial sensors configured to generate inertial sensor data indicating movement of the head mounted display in accordance with movement of the user by whom the head mounted display is worn. The virtual reality scene is generated to request the user to make a gesture to cause a specific action within the virtual reality scene. For example, the virtual reality scene may show a graphic of the gesture to be made, or may display a textual instruction of the gesture to be made, or may simply show a scene that implicitly invites the user to make the requested gesture. The requested gesture causes movement of the head mounted display and generation of inertial sensor data corresponding to the movement of the head mounted display.

The method also includes an operation 803 for receiving inertial sensor data from the head mounted display. The inertial sensor data indicates movement of the head mounted display in response to user making the gesture to cause the specific action within the virtual reality scene. The method also includes an operation 805 for correlating the received inertial sensor data to the specific action within the virtual reality scene, such that the specific action is executed within the virtual reality scene upon subsequent receipt of inertial sensor data substantially equal to the inertial sensor data received in operation 803. It should be understood that the correlating of operation 805 associates the received inertial sensor data and the specific action to a context of the virtual reality scene.

Correlating of the received inertial sensor data to the specific action within the virtual reality scene is effectively a calibration of the user movement associated with the received inertial sensor data to cause the specific action within the virtual reality scene. In some embodiments, correlating the received inertial sensor data to the specific action in operation 805 includes determining a route of movement of the head mounted display and determining a rate of movement of the head mounted display, and recording an association between the specific action and the determined route of movement of the head mounted display and the determined rate of movement of the head mounted display.

The method of FIG. 8 can also include repetition of operations 801, 803, and 805 for each of multiple specific actions within the virtual reality scene. In some embodiments, the multiple specific actions within the virtual reality scene include movement actions of moving forward, moving backward, moving left, and moving right, where the gestures made by the user to cause these movement actions are respectively a lean forward, a lean backward, a lean left, and a lean right. In some embodiments, the multiple specific actions within the virtual reality scene include viewing actions of looking left, looking right, looking up, and looking down, where the gestures made by the user to cause these viewing actions are respectively a left head turn, a right head turn, an upward head tilt, and downward head tilt. In some embodiments, the multiple specific actions within the virtual reality scene include vertical movement actions of jumping and ducking, where the gestures made by the user to cause these vertical movement actions are respectively a jump and a duck. In some embodiments, the multiple specific actions within the virtual reality scene include sitting, where the gesture made by the user to cause the sitting is a squat. In some embodiments, the multiple specific actions within the virtual reality scene include zooming actions of zooming in and zooming out, where the gestures made by the user to cause these zooming actions are respectively a head movement forward and a head movement backward.

The method of FIG. 8 can also include an optional operation of receiving inertial sensor data from one or more external inertial sensors positioned on the body of the user who is wearing the head mounted display. The external inertial sensor data indicates movement of the user's body. The method can also include an operation for comparing the external inertial sensor data to the inertial sensor data received from the inertial sensors in the head mounted display in order to determine a specific movement made by the user, such as discussed with regard to FIG. 3L. Then, the operation 805 for correlating the received inertial sensor data to the specific action within the virtual reality scene will take into account the external inertial sensor data received from the one or more external inertial sensors positioned on the body of the user.

Figure 9A:
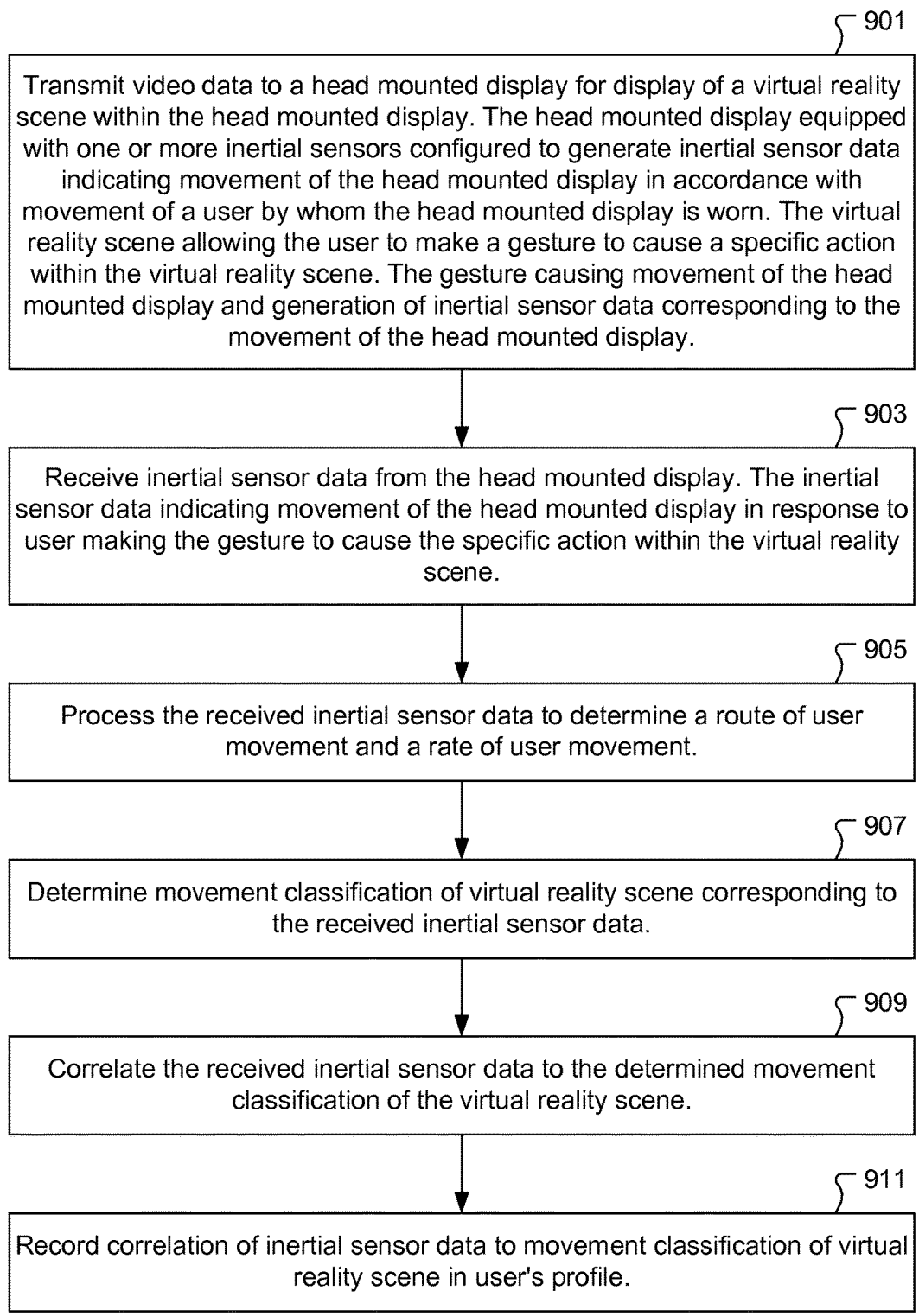
FIG. 9A shows a flowchart of a method for operating a computer system to dynamically calibrate actions within a virtual reality scene based on inertial sensor data received from a head mounted display, in accordance with an example embodiment of the present invention.

FIG. 9A shows a flowchart of a method for operating a computer system to dynamically calibrate actions within a virtual reality scene based on inertial sensor data received from a head mounted display, in accordance with an example embodiment of the present invention. The method includes an operation 901 for transmitting video data to a head mounted display for display of a virtual reality scene within the head mounted display, such that a user wearing the head mounted display is able to view the virtual reality scene. The head mounted display is equipped with one or more inertial sensors configured to generate inertial sensor data indicating movement of the head mounted display in accordance with movement of the user by whom the head mounted display is worn. The virtual reality scene is generated to allow the user to make a gesture to cause a specific action within the virtual reality scene. For example, the virtual reality scene may be for an application with which the user is already familiar. The gesture by the user causes movement of the head mounted display and generation of inertial sensor data corresponding to the movement of the head mounted display.

The method also includes an operation 903 for receiving inertial sensor data from the head mounted display. The inertial sensor data indicates movement of the head mounted display in response to user making the gesture to cause the specific action within the virtual reality scene. The method also includes an operation 905 for determining a route of user movement and a rate of user movement through processing of the received inertial sensor data. The method also includes an operation 907 for determining a movement classification of the virtual reality scene corresponding to the received inertial sensor data. The method also includes an operation 909 for correlating the received inertial sensor data to the determined movement classification of the virtual reality scene. And, the method includes an operation 911 for recording the correlation of the received inertial sensor data to the determined movement classification of the virtual reality scene in a profile of the user. FIG. 9B shows an example correlation of the received inertial sensor data to the determined movement classification of the virtual reality scene in the profile of the user, in accordance with an example embodiment of the present invention. The correlation of the received inertial sensor data to the determined movement classification of the virtual reality scene in the profile of the user can be continuously and automatically updated by the application associated with the virtual reality scene as the user moves to cause actions within the virtual reality scene.

The method of FIG. 9A can also include an optional operation of receiving inertial sensor data from one or more external inertial sensors positioned on the body of the user who is wearing the head mounted display. The external inertial sensor data indicates movement of the user's body. The method can also include an operation for comparing the external inertial sensor data to the inertial sensor data received from the inertial sensors in the head mounted display in order to determine a specific movement made by the user, such as discussed with regard to FIG. 3L. Then, the operation 905 for determining the route of the user movement will take into account the external inertial sensor data received from the one or more external inertial sensors positioned on the body of the user in comparison with the inertial sensor data received from the inertial sensors within the head mounted display.

Figure 10:
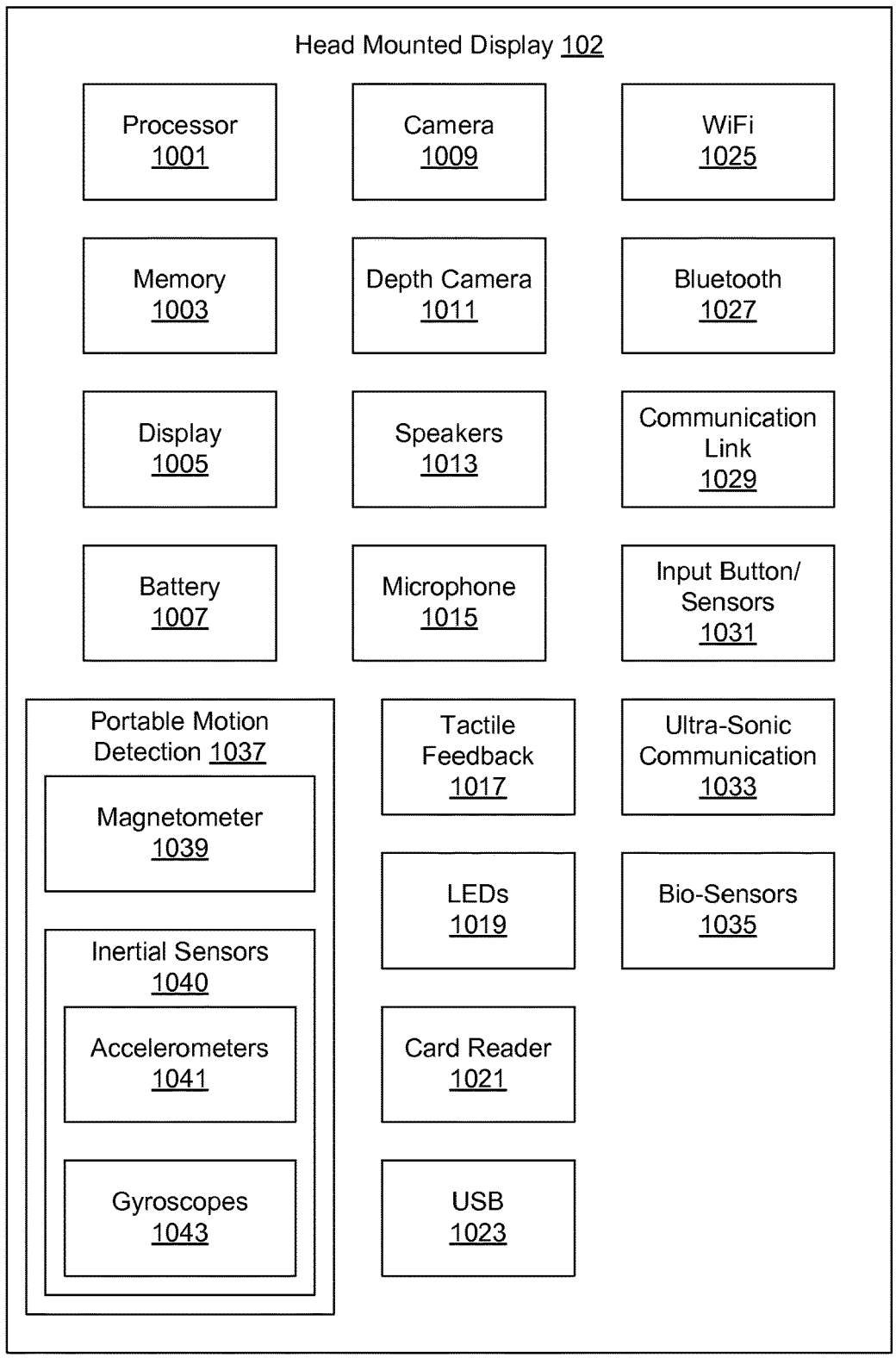
FIG. 10 shows a block-level architecture of the head mounted display, in accordance with an example embodiment of the present invention.

FIG. 10 shows a block-level architecture of the head mounted display 102, in accordance with an example embodiment of the present invention. It should be understood that more or less components can be included or excluded from the head mounted display 102 than what is shown in FIG. 10, depending on the configuration and functions enabled. The head mounted display 102 may include a processor 1001 for executing program instructions. A memory 1003 is provided for data storage purposes, and may include both volatile and non-volatile memory. A display 1005 is included which provides a visual interface that a user may view. The display 1005 can be defined by one single display, or in the form of a separate display screen for each eye. When two display screens are provided, it is possible to provide left-eye and right-eye video content separately. Separate presentation of video content to each eye, for example, can provide for better immersive control of three-dimensional content of the virtual reality scene.

A battery 1007 may be provided as a power source for the head mounted display 102. In other embodiments, the power source can include an outlet connection to power. In other embodiments, an outlet connection to power and a battery 1007 may be provided. In some embodiments, the head mounted display 102 obtains power from the same cable or can connect to another cable. In some embodiments, the head mounted display 102 can have a battery 1007 that is rechargeable, so as to avoid extra power cords.

A motion detection module 1037 may include any of various kinds of motion sensitive hardware, such as a magnetometer 1039, an accelerometer 1041, and a gyroscope 1043. The magnetometer 1039 measures the strength and direction of the magnetic field in the vicinity of the head mounted display 102. In some embodiments, three magnetometers 1039 are used within the head mounted display 102, ensuring an absolute reference for the world-space yaw angle. In some embodiments, the magnetometer 1039 is designed to span the Earth's magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In some embodiments, the accelerometer 1041 is used together with the magnetometer 1039 to obtain the inclination and azimuth of the head mounted display 102.

The accelerometer 1041 is a device for measuring acceleration and gravity induced reaction forces. Single and multiple axis (e.g., six-axis) models are able to detect magnitude and direction of the acceleration in different directions. The accelerometer 1041 is used to sense inclination, vibration, and shock. In one embodiment, three accelerometers 1041 are used to provide the direction of gravity, which gives an absolute reference for two angles (world-space pitch and world-space roll).

The gyroscope 1043 is a device for measuring or maintaining orientation, based on the principles of angular momentum. In one embodiment, three gyroscopes 1043 provide information about movement across the respective coordinate axes (x, y, and z) based on inertial sensing. The gyroscopes 1043 help in detecting fast rotations. However, the gyroscopes 1043 can drift overtime without the existence of an absolute reference. This requires resetting the gyroscopes 1043 periodically, which can be done using other available information, such as positional/orientation determination based on visual tracking of an object, accelerometer, magnetometer, etc.

A camera 1009 is provided for capturing images and image streams of the real-world environment to which the head mounted display 102 is exposed. More than one camera 1009 (optionally) may be included in the head mounted display 102, including a camera 1009 that is rear-facing (directed away from a user when the user is viewing the display of the head mounted display 102), and a camera 1009 that is front-facing (directed towards the user when the user is viewing the display of the head mounted display 102). Additionally, a depth camera 1011 may be included in the head mounted display 102 for sensing depth information of objects in the real-world environment to which the head mounted display 102 is exposed.

The head mounted display 102 includes speakers 1013 for providing audio output. Also, a microphone 1015 may be included for capturing audio from the real-world environment, including sounds from the ambient environment, speech made by the user, etc. The head mounted display 102 includes tactile feedback module 1017 for providing tactile feedback to the user. In one embodiment, the tactile feedback module 1017 is capable of causing movement and/or vibration of the head mounted display 102 so as to provide tactile feedback to the user.

LEDs 1019 are provided as visual indicators of statuses of the head mounted display 102. For example, an LED may indicate battery level, power on, etc. LEDs 1019 can also be used for visual tracking of the position and movement of the head mounted display 102 by a camera viewing the real-world environment in which the head mounted display 102 is located. A card reader 1021 is provided to enable the head mounted display 102 to read and write information to and from a memory card. A USB interface 1023 is included as one example of an interface for enabling connection of peripheral devices, or connection to other devices, such as other portable devices, computers, etc. In various embodiments of the head mounted display 102, any of various kinds of interfaces may be included to enable greater connectivity of the head mounted display 102.

A WiFi module 1025 may be included for enabling connection of the head mounted display 102 to the Internet via wireless networking technologies. Also, the head mounted display 102 may include a Bluetooth module 1027 for enabling wireless connection to other devices. A communications link 1029 may also be included for connection to other devices. In one embodiment, the communications link 1029 utilizes infrared transmission for wireless communication. In other embodiments, the communications link 1029 may utilize any of various wireless or wired transmission protocols for communication with other devices.

Input buttons/sensors 1031 are included to provide an input interface for the user. Any of various kinds of input interfaces may be included, such as buttons, gestures, touchpad, joystick, trackball, etc. An ultra-sonic communication module 1033 may be included in the head mounted display 102 for facilitating communication with other devices via ultra-sonic technologies.

The head mounted display 102 can also include one or more bio-sensors 1035 to enable detection of physiological data from the user wearing the head mounted display 102. In some embodiments, the bio-sensors 1035 include one or more dry electrodes for detecting bio-electric signals of the user through the user's skin, voice detection, eye retina detection to identify users/profiles, etc.

It should be understood that the components of the head mounted display 102 as shown in FIG. 10 are examples of components that may be included in head mounted display 102, and do not represent all possible components that can be included in the head mounted display 102. For example, in various embodiments, the head mounted display 102 may or may not include some of the components shown in FIG. 10. And, in some embodiments, the head mounted display 102 may include additional components not shown in FIG. 10.

Figure 11A:
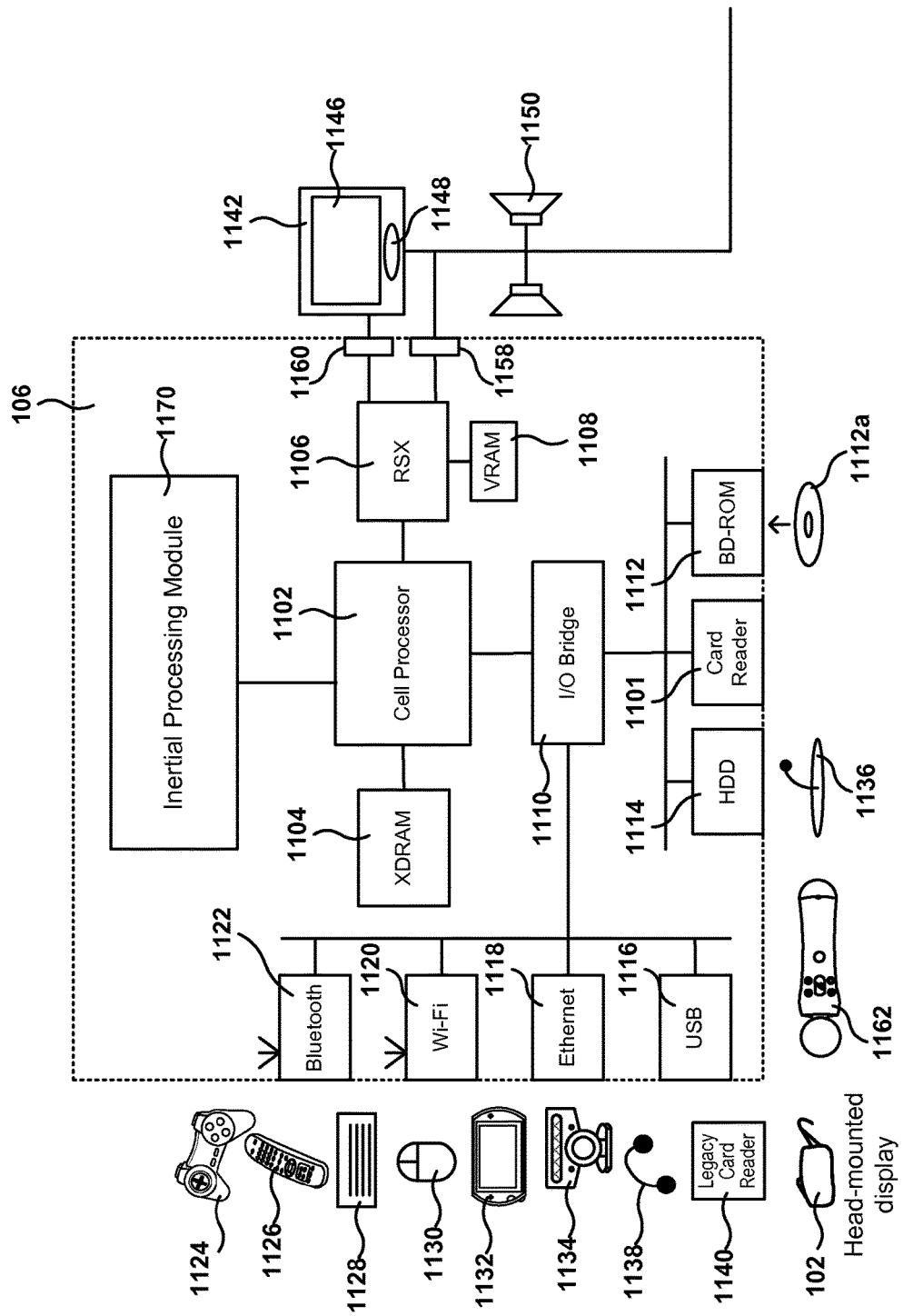
FIG. 11A shows an example block-level architecture of the computer system and other interfacing hardware that may be used to implement some embodiments of the present invention.

FIG. 11A shows an example block-level architecture of the computer system 106 and other interfacing hardware that may be used to implement some embodiments of the present invention. In some embodiments, the computer system 106 may be the Sony® PlayStation® entertainment device. The term PlayStation® as used herein refers to any of the original PlayStation®, the PlayStation 2®, the PlayStation 3®, the PlayStation 4®, or any future version of the PlayStation® gaming system. The computer system 106 can include a cell processor 1102, a Rambus® dynamic random access memory (XDRAM) unit 1104, a reality synthesizer graphics unit 1106 with a dedicated video random access memory (VRAM) unit 1108, and an I/O bridge 1110. The computer system 106 can also include a Blu Ray® Disk BD-ROM® optical disk reader 1112 for reading from a disk 1112a and a removable slot-in hard disk drive (HDD) 1114, accessible through the I/O bridge 1110. Optionally, the computer system 106 also includes a memory card reader 1101 for reading compact flash memory cards, Memory Stick® memory cards and the like, which is similarly accessible through the I/O bridge 1110. The I/O bridge 1110 also connects to six Universal Serial Bus (USB) 2.0 ports 1116, a gigabit Ethernet port 1118, an IEEE 802.11b/g wireless network (Wi-Fi) port 1120, and a Bluetooth® wireless link port 1122 capable of supporting of up to seven Bluetooth connections.

In operation, the I/O bridge 1110 handles all wireless, USB and Ethernet data, including data from one or more game controllers 1162 and 1124. For example, when a user is playing a game, the I/O bridge 1110 receives data from the game controller 1162 and 1124 via a Bluetooth link and directs it to the cell processor 1102, which updates the current state of the game accordingly.

The wireless, USB and Ethernet ports also provide connectivity for other peripheral devices in addition to game controllers 1162 and 1124, such as a remote control 1126, a keyboard 1128, a mouse 1130, a portable entertainment device 1132 such as a Sony PSP® entertainment device, a video camera such as a PlayStation® Eye Camera 1134, a shape object 1136, and a microphone 1138. Such peripheral devices may therefore in principle be connected to the computer system 106 wirelessly. For example, the portable entertainment device 1132 may communicate via a Wi-Fi ad-hoc connection, while the shape object 1136 may communicate via a Bluetooth link.

The provision of these interfaces means that the computer system 106 is also potentially compatible with other peripheral devices such as digital video recorders (DVRs), set-top boxes, digital cameras, portable media players, Voice over Internet Protocol (IP) telephones, mobile telephones, printers and scanners. In addition, a legacy memory card reader 1140 may be connected to the system unit via a USB port 1116, enabling the reading of memory cards of the kind used by the earlier PlayStation devices.

The game controllers 1162 and 1124 are operable to communicate wirelessly with the computer system 106 via the Bluetooth link, or to be connected to a USB port, thereby also providing power by which to charge the battery of the game controllers 1162 and 1124. Game controllers 1162 and 1124 can also include memory, a processor, a memory card reader, permanent memory such as flash memory, light emitters such as an illuminated spherical section, light emitting diodes (LEDs), or infrared lights, microphone and speaker for ultrasound communications, an acoustic chamber, a digital camera, an internal clock, a recognizable shape facing the game console, and wireless communications using protocols such as Bluetooth®, WiFi™, etc. The recognizable shape can be in a shape substantially of a sphere, a cube, parallelogram, a rectangular parallelepiped, a cone, a pyramid, a soccer ball, a football or rugby ball, an imperfect sphere, a section of a sphere, a truncated pyramid, a truncated cone, a baseball bat, a truncated cube, a polyhedron, a star, etc., or a combination of two of more of these shapes.

Game controller 1124 is a controller designed to be used with two hands, and game controller 1162 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Sony PSP® portable device may be used as a controller. In the case of the Sony PSP® portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1126 is also operable to communicate wirelessly with the computer system 106 via a Bluetooth link. The remote control 1126 includes controls suitable for the operation of the Blu Ray™ Disk BD-ROM reader 1112 and for the navigation of disk content. The Blu Ray™ Disk BD-ROM reader 1112 is operable to read CD-ROMs compatible with any PlayStation devices, in addition to conventional pre-recorded and recordable CDs, and so-called Super Audio CDs. The reader 1112 is also operable to read DVD-ROMs compatible with any Playstation devices, in addition to conventional pre-recorded and recordable DVDs. The reader 1112 is further operable to read BD-ROMs compatible with any PlayStation devices, as well as conventional pre-recorded and recordable Blu-Ray Disks.

The computer system 106 is operable to supply audio and video, either generated or decoded by the PlayStation device via the Reality Synthesizer graphics unit (RSX) 1106, through audio and video connectors to a display and sound output device 1142 such as a monitor or television set having a display 1146 and one or more loudspeakers 1148, or stand-alone speakers 1150. In some embodiments, voice and gaze inputs are utilized to play sound toward specific audio speakers according to the POG of the user. The audio connectors 1158 may include conventional analogue and digital outputs while the video connectors 1160 may variously include component video, S-video, composite video and one or more High Definition Multimedia Interface (HDMI) outputs. Consequently, video output may be in formats such as PAL or NTSC, or in 720p, 1080i or 1080p high definition. Audio processing (generation, decoding and so on) is performed by the cell processor 1302. The Play- Station 3 device's operating system supports Dolby® 5.1 surround sound, Dolby® Theatre Surround (DTS), and the decoding of 7.1 surround sound from Blu-Ray® disks.

Figure 11B:
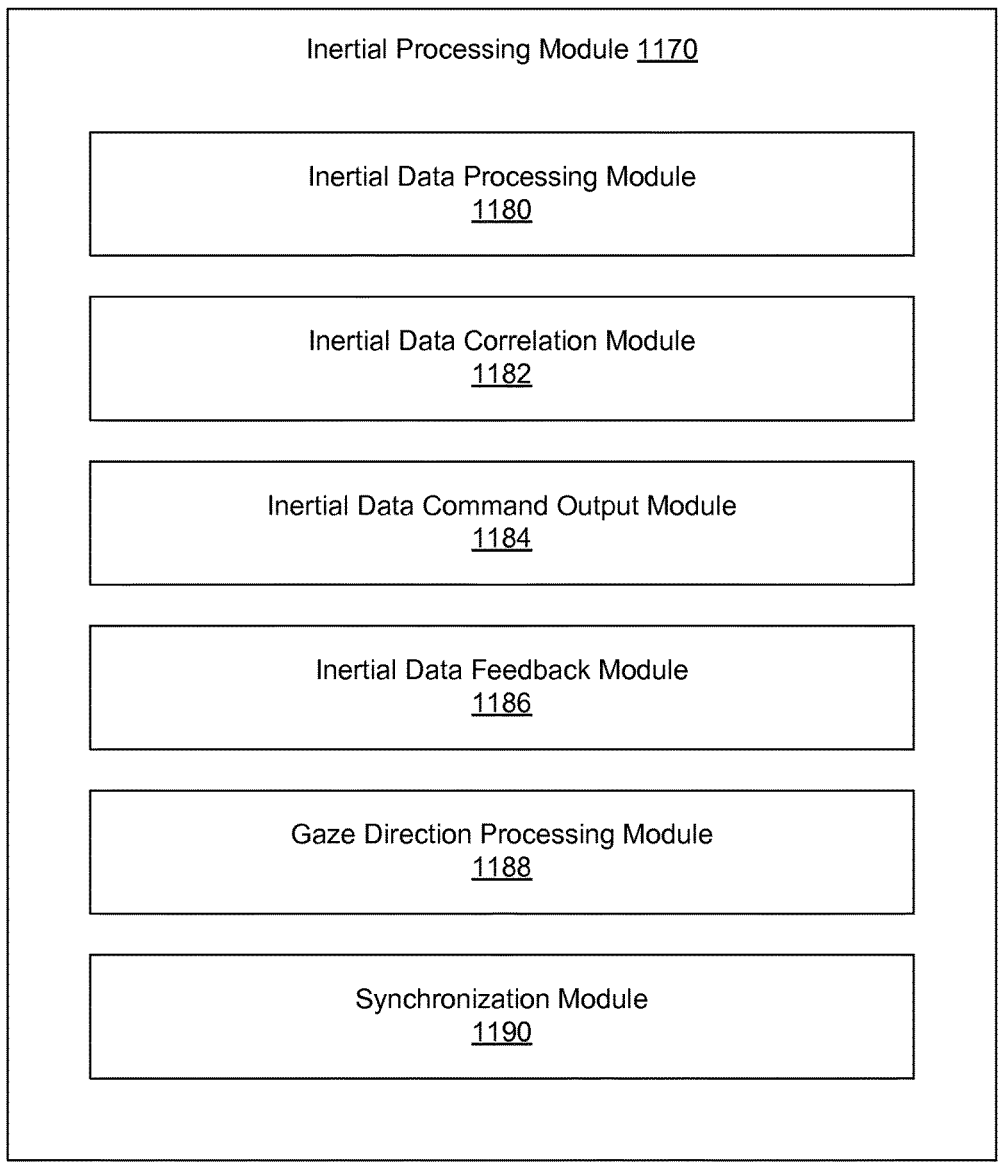
FIG. 11B shows a block-level diagram of the inertial processing module, in accordance with an example embodiment of the present invention.

The computer system 106 also includes an inertial processing module 1170 in communication with the cell processor 1102. The inertial processing module 1170 is connected to receive inertial sensor data from inertial sensors within the head mounted display 102. FIG. 11B shows a block-level diagram of the inertial processing module 1170, in accordance with an example embodiment of the present invention. The inertial processing module 1170 includes an inertial data processing module 1180 configured to receive inertial sensor data from the head mounted display 102. The inertial sensor data indicates movement of the head mounted display 102 in accordance with movement of a user by whom the head mounted display 102 is worn. The movement of the user is based on a virtual reality scene displayed within the head mounted display 102. The inertial data processing module 1180 is configured to determine from the inertial sensor data a route of movement of the head mounted display 102 and a rate of movement of the head mounted display 102. In some embodiments, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. However, in other embodiments, the route of movement of the head mounted display may correspond to essentially any user movement within the movement capabilities of the human body.

The inertial processing module 1170 also includes an inertial data correlation module 1182 configured to correlate the route of movement of the head mounted display and the rate of movement of the head mounted display to an action within the virtual reality scene currently displayed within the head mounted display 102. In some embodiments, the action within the virtual reality scene is a movement of a viewpoint of the user within the virtual reality scene. In some embodiments, the action within the virtual reality scene is a change in direction of a viewpoint of the user within the virtual reality scene. In some embodiments, the action within the virtual reality scene is a zoom-in or a zoom-out of a viewpoint of the user within the virtual reality scene. In some embodiments, the action within the virtual reality scene is a movement of an object displayed within the virtual reality scene. It should be understood, however, that the action within the virtual reality scene to which the inertial sensor data is correlated can be essentially any type of action commensurate with the current context of the virtual reality scene as displayed to the user within the head mounted display.

The inertial processing module 1170 also includes an inertial data command output module 1184 configured to provide a command signal to a rendering engine, such as the Reality Synthesizer graphics unit (RSX) 1106. The command signal directs the rendering engine to update the virtual reality scene to reflect implementation of the action correlated to the route of movement and rate of movement of the head mounted display 102.

In some embodiments, the inertial data correlation module 1182 is configured to determine a set of allowable virtual movements within a current context of the virtual reality scene. In some embodiments, the inertial data correlation module 1182 is configured to map the route of movement of the head mounted display to a corresponding virtual movement within the set of allowable virtual movements. In some embodiments, the inertial data correlation module 1182 is configured to query a calibration table in order to map the route of movement of the head mounted display to the corresponding virtual movement within the set of allowable virtual movements. In such embodiments, the calibration table defines associations between a number of routes of movement of the head mounted display and resulting actions within the virtual reality scene.

Also, in some embodiments, the inertial data correlation module 1182 is configured to map the rate of movement of the head mounted display to a rate of the corresponding virtual movement within the virtual reality scene. In some embodiments, the inertial data correlation module 1182 is configured to query a calibration table in order to map the route of movement and the rate of movement of the head mounted display to the corresponding virtual movement within the virtual reality scene. In such embodiments, the calibration table defines associations between a number of combinations of routes and rates of movement of the head mounted display and resulting actions within the virtual reality scene.

Also, in some embodiments, the inertial data correlation module 1182 is configured to determine that the route of movement of the head mounted display does not correspond to any virtual movement within the set of allowable virtual movements. In some embodiments, the inertial processing module 1170 includes an inertial data feedback module 1186 configured to generate and transmit a feedback signal to the head mounted display, where the feedback signal notifies the user that the movement of the head mounted display does not correspond to any virtual movement within the set of allowable virtual movements.

In some embodiments, the inertial processing module 1170 includes a gaze direction processing module 1188 configured to receive gaze direction data from the head mounted display. The gaze direction data indicates a vision focus direction of the user upon the virtual reality scene displayed within the head mounted display. The inertial processing module 1170 can also include a synchronization module 1190 configured to synchronize the gaze direction data with the inertial sensor data to determine a synchronized vision focus direction. In some embodiments, the synchronization module 1190 is configured to temporally align the gaze direction data with the inertial sensor data.

When the gaze direction processing module 1188 and synchronization module 1190 are utilized, the inertial data correlation module 1182 can be configured to use both the route of movement of the head mounted display and the synchronized vision focus direction to determine the action within the virtual reality scene. In some embodiments, the inertial data correlation module 1182 is configured to use the synchronized vision focus direction as a directional weighting parameter in determining the action within the virtual reality scene. In some embodiments, a magnitude of the directional weighting parameter is proportional to an amount of time that the synchronized vision focus direction persists in a given direction.

An application programming interface (API) can be made available to provide applications with access to the functions and outputs of the inertial processing module 1170. The API can be used by multiple applications, e.g., games, in a simultaneous manner. It should be understood that the inertial processing module 1170 and/or various modules (1180, 1182, 1184, 1186, 1188, 1190) therein can be implemented as software and/or firmware in various embodiments. Also, in some embodiments, portions of the inertial processing module 1170 and/or various modules (1180,

1182, 1184, 1186, 1188, 1190) therein can be implemented as hardware, such as when rapid data processing is required for application performance.

As discussed herein, methods and systems are provided in which movement of the head mounted display is used to determine an action to be made within a virtual reality scene currently displayed within the head mounted display, where the route and rate of movement of the head mounted display is detected and measured using inertial sensors disposed within the head mounted display. In this manner, the user wearing the head mounted display can act as a human controller, e.g., human joystick, to affect actions within the virtual reality scene. In some embodiments, the real-world movement of the head mounted display is used to control movement of the user's avatar in the virtual reality scene. In some embodiments, the real-world movement of the head mounted display is used to control movement of the user's point of view in the virtual reality scene, such as making it appear as though the user is moving within the virtual reality scene. It should be appreciated that depending on the application, the real-world movement of the head mounted display can be used to control essentially any type of action in the virtual reality scene.

In some embodiments, the head mounted display is associated with a home position in the real world. Movement of the head mounted display from this home position is detected and translated to direct an action, i.e., change, in the virtual reality scene. The action in the virtual reality scene can be essentially any action amenable to control by detection of physical movement of the head mounted display. For example, in some embodiments, movement of the head mounted display can be used to direct changing of user's position in the virtual reality scene, whether it be by walking, running, jumping, etc. Also, in some embodiments, movement of the head mounted display can be used to direct changing of the user's viewpoint in the virtual reality scene, whether it be by zooming in, zooming out, looking is a particular direction, etc.

In some embodiments, a calibration process can be performed to establish correlations between the movement of the head mounted display and the actions within the virtual reality scene. Such calibration processes can include mapping of the user's route of motion as detected by the inertial sensors in the head mounted display to movement of the user's avatar in the virtual reality scene. Also, such calibration processes can include mapping the user's rate of motion (acceleration/deceleration) as detected by the inertial sensors in the head mounted display to the rate of movement of the user's avatar in the virtual reality scene. In this manner, the inertial sensors within the head mounted display are used to determine directionality and velocity of the user's avatar within the virtual reality scene based on the calibration process. Also, in some embodiments, movement of the head mounted display can be correlated to movement of the user's entire body, thereby reducing or removing the need to track the user's body movements by means other than the head mounted display. Also, in some embodiments, detection of the user's eye movements, i.e., gaze detection, can be combined with the detected movement of the head mounted display to determine the action within the virtual reality scene.

The context of the virtual realty scene can be used to gauge the actions within the virtual reality scene that correspond to the detected head mounted display movement. For example, task-specific zoom-in/zoom-out actions can be based on the visual context of the currently displayed virtual reality scene. For instance, the zoom-in/zoom-out amounts in a virtual reality scene that displays a large outdoor scene may be greater for a given movement of the head mounted display as compared to a virtual reality scene that displays a book for reading by the user. Also, the context of the virtual reality scene can be used to gauge the rates of action, e.g., movement, within the virtual reality scene that correspond to the detected head mounted display movement. In some embodiments, context-based gauging of the actions within the virtual reality scene that correspond with the detected head mounted display movement can be pre-defined. However, in some embodiments, context-based gauging of the actions within the virtual reality scene that correspond with the detected head mounted display movement can be determined during execution of the application that generates the virtual reality scene.

It should be understood that the methods and systems discussed herein by which movement of the head mounted display is used to determine an action to be made within a virtual reality scene can be used with any type of virtual reality scene and any type of augmented reality scene that is capable of being displayed to the user within the head mounted display. For example, the methods and systems discussed herein by which movement of the head mounted display is used to determine an action to be made within a virtual reality scene can be utilized with applications for: games (such as first person shooter games, among essentially any other type of computer game), hotel virtual reality tours, travel site virtual reality tours, virtual reality tours of global places of interest, collaboration between remote users, shared/synchronized virtual reality spaces, virtual meetings, medical practices (such as remote surgical assistance and remote examination, among others), and any other type of activity that lends itself to display of a virtual reality scene within the head mounted display worn by the user.

With the methods and systems discussed herein, when a user wearing the head mounted display wishes to move about a virtual reality scene, the user can simply make gestures followed by easy body movements. For example, the user can point with his hand toward a direction and then slightly lean forward toward that direction. In other embodiments, simply leaning forward toward a direction, while wearing the head mounted display can cause the character or user to move in the particular direction in the virtual reality scene. To stop moving, the user can just stop leaning forward. The movement, e.g., leaning, can be very slight, so long as the inertial sensors in the head mounted display can detect the movement or changes in movement. The user's head can therefore act as a type of joystick, which is a natural type of motion made by the user that may want to walk in a direction or stop walking. For instance, if the user wants to walk forward in real life, the user generally leans forward. This lean can be detected, which causes the user to move in the virtual reality scene, as currently displayed within the head mounted display.

Also, the movement of the head mounted display as detected by the inertial sensors therein can be combined with other inputs to cause corresponding actions in the virtual reality scene. For example, a foot pedal can be used such that the user can step on the pedal to move, and the direction of movement can be detected by the user's lean through the inertial sensors in the head mounted display, as if the user is acting as a joystick controller. To augment the gesture, the direction in which the user is looking in the scene, via eye tracking, can be used to establish the direction of movement, followed by the leaning of the user's head in the direction. The user's gaze in another direction can be used to naturally guide the character in the virtual reality scene. Thus, a combination of gesture steering methods can be used, using the natural motions of the user's head and/or other gestures.

One implementation of the methods and systems discussed herein can be to perform remote surgery. If a surgeon is focusing on some particular part of the body, via some focused gesture, and the surgeon makes a natural motion forward, so as to see closer, the gesture causes a magnification, so that the user need not actually have to move too close. This gesturing is predicting that the user wants magnification. Similar to when a user stares at the screen and then appears to move closer. This is an indication that a zoom-in is needed, and it can be done automatically. It should be understood that this is only an example of an essentially limitless number of applications of the methods and system discussed herein by which inertial sensor based movement detection of a head mounted display can be used to affect changes/actions in a virtual reality scene displayed to the user wearing the head mounted display.

In some embodiments of the present invention, a method includes: A) transmitting video data to a head mounted display for display of a virtual reality scene within the head mounted display, B) receiving inertial sensor data from one or more inertial sensors within the head mounted display, the inertial sensor data indicating movement of the head mounted display in accordance with movement of a user by whom the head mounted display is worn, the movement of the user based on the virtual reality scene displayed within the head mounted display, C) correlating the received inertial sensor data to an action within the virtual reality scene, and D) generating an update to the virtual reality scene to reflect implementation of the action. In some embodiments of the present invention, the correlating of C) includes determining a route of movement of the head mounted display and determining a rate of movement of the head mounted display. In some embodiments of the present invention, the correlating of C) includes determining a set of allowable virtual movements within a current context of the virtual reality scene. In some embodiments of the present invention, the correlating of C) includes mapping the route of movement of the head mounted display to a corresponding virtual movement within the set of allowable virtual movements. In some embodiments of the present invention, mapping the route of movement of the head mounted display to the corresponding virtual movement includes querying a calibration table, the calibration table defining associations between a number of routes of movement of the head mounted display and resulting actions within the virtual reality scene. In some embodiments of the present invention, the correlating of C) includes mapping the rate of movement of the head mounted display to a rate of the corresponding virtual movement within the virtual reality scene. In some embodiments of the present invention, mapping the route of movement and rate of movement of the head mounted display to the corresponding virtual movement includes querying a calibration table, the calibration table defining associations between a number of combinations of routes and rates of movement of the head mounted display and resulting actions within the virtual reality scene. In some embodiments of the present invention, the correlating of C) includes determining that the route of movement of the head mounted display does not corresponding to any virtual movement within the set of allowable virtual movements.

In some embodiments of the present invention, the method includes transmitting a feedback signal to the head mounted display, the feedback signal notifying the user that the movement of the head mounted display does not correspond to any virtual movement within the set of allowable virtual movements. In some embodiments of the present invention, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. In some embodiments of the present invention, the action within the virtual reality scene is a movement of a viewpoint of the user within the virtual reality scene. In some embodiments of the present invention, the action within the virtual reality scene is a change in direction of a viewpoint of the user within the virtual reality scene. In some embodiments of the present invention, the action within the virtual reality scene is a zoom-in or a zoom-out of a viewpoint of the user within the virtual reality scene. In some embodiments of the present invention, the action within the virtual reality scene is a movement of an object displayed within the virtual reality scene.

In some embodiments of the present invention, the method includes receiving gaze direction data from one or more gaze detectors within the head mounted display, the gaze direction data indicating a vision focus direction of the user upon the virtual reality scene displayed within the head mounted display, and synchronizing the gaze direction data with the inertial sensor data to determine a synchronized vision focus direction. In some embodiments of the present invention, the correlating of C) includes determining a route of movement of the head mounted display and determining a rate of movement of the head mounted display, wherein the correlating of C) includes using both the route of movement of the head mounted display and the synchronized vision focus direction to determine the action within the virtual reality scene. In some embodiments of the present invention, the synchronized vision focus direction is applied as a directional weighting parameter in determining the action within the virtual reality scene. In some embodiments of the present invention, a magnitude of the directional weighting parameter is proportional to an amount of time that the synchronized vision focus direction persists in a given direction. In some embodiments of the present invention, synchronizing the gaze direction data with the inertial sensor data includes temporal alignment of the gaze direction data with the inertial sensor data.

In some embodiments of the present invention, a method includes: A) receiving video data at a head mounted display, the video data defining a virtual reality scene, B) displaying the virtual reality scene within the head mounted display, C) operating one or more inertial sensors within the head mounted display to generate inertial sensor data indicating movement of the head mounted display in accordance with movement of a user by whom the head mounted display is worn, the movement of the user corresponding to an action within the virtual reality scene, D) transmitting the inertial sensor data to a computing system from which the video data is received, E) receiving, from the computing system, video data defining an updated virtual reality scene reflective of the action within the virtual reality scene corresponding to the movement of the user, and F) displaying the updated virtual reality scene within the head mounted display. In some embodiments of the present invention, the inertial sensor data provides for determination of a route of movement of the head mounted display and determination of a rate of movement of the head mounted display. In some embodiments of the present invention, the route of movement of the head mounted display and the rate of movement of the head mounted display are mapped by the computing system to a corresponding virtual movement within a set of allowable virtual movements within a current context of the virtual reality scene.

In some embodiments of the present invention, the method includes receiving, from the computing system, a feedback signal indicating that the route of movement of the head mounted display does not have any corresponding virtual movement within the set of allowable virtual movements within the current context of the virtual reality scene, and notifying the user of receipt of the feedback signal. In some embodiments of the present invention, the notifying is performed by operating the head mounted display to provide one or more of an audible signal, a tactile signal, and a visual signal. In some embodiments of the present invention, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. In some embodiments of the present invention, the action within the virtual reality scene is a movement of a viewpoint of the user within the virtual reality scene. In some embodiments of the present invention, the action within the virtual reality scene is a change in direction of a viewpoint of the user within the virtual reality scene. In some embodiments of the present invention, the action within the virtual reality scene is a zoom-in or a zoom-out of a viewpoint of the user within the virtual reality scene. In some embodiments of the present invention, the action within the virtual reality scene is a movement of an object displayed within the virtual reality scene.

In some embodiments of the present invention, the method includes operating one or more gaze detectors within the head mounted display to generate gaze direction data indicating a vision focus direction of the user upon the virtual reality scene displayed within the head mounted display, and transmitting the gaze direction data to the computing system from which the video data is received, the gaze direction data synchronized with the inertial sensor data to determine a synchronized vision focus direction. In some embodiments of the present invention, the inertial sensor data provides for determination of a route of movement of the head mounted display and determination of a rate of movement of the head mounted display, wherein both the route of movement of the head mounted display and the synchronized vision focus direction are used to determine the action within the virtual reality scene corresponding to the movement of the user.

In some embodiments of the present invention, a system includes: A) an inertial data processing module configured to receive inertial sensor data from a head mounted display, the inertial sensor data indicating movement of the head mounted display in accordance with movement of a user by whom the head mounted display is worn, the movement of the user based on a virtual reality scene displayed within the head mounted display, the inertial data processing module configured to determine from the inertial sensor data a route of movement of the head mounted display and a rate of movement of the head mounted display, B) an inertial data correlation module configured to correlate the route of movement of the head mounted display and the rate of movement of the head mounted display to an action within the virtual reality scene, and C) an inertial data command output module configured to provide a command signal to a rendering engine, the command signal directing the rendering engine to update the virtual reality scene to reflect implementation of the action. In some embodiments of the present invention, the inertial data correlation module is configured to determine a set of allowable virtual movements within a current context of the virtual reality scene. In some embodiments of the present invention, the inertial data correlation module is configured to map the route of movement of the head mounted display to a corresponding virtual movement within the set of allowable virtual movements. In some embodiments of the present invention, the inertial data correlation module is configured to query a calibration table in order to map the route of movement of the head mounted display to the corresponding virtual movement within the set of allowable virtual movements, the calibration table defining associations between a number of routes of movement of the head mounted display and resulting actions within the virtual reality scene. In some embodiments of the present invention, the inertial data correlation module is configured to map the rate of movement of the head mounted display to a rate of the corresponding virtual movement within the virtual reality scene. In some embodiments of the present invention, the inertial data correlation module is configured to query a calibration table in order to map the route of movement and the rate of movement of the head mounted display to the corresponding virtual movement within the virtual reality scene, the calibration table defining associations between a number of combinations of routes and rates of movement of the head mounted display and resulting actions within the virtual reality scene. In some embodiments of the present invention, the inertial data correlation module is configured to determine that the route of movement of the head mounted display does not correspond to any virtual movement within the set of allowable virtual movements.

In some embodiments of the present invention, the system includes an inertial data feedback module configured to generate and transmit a feedback signal to the head mounted display, the feedback signal notifying the user that the movement of the head mounted display does not correspond to any virtual movement within the set of allowable virtual movements. In some embodiments of the present invention, the route of movement of the head mounted display corresponds to one or more user movements within a set of user movements including a forward lean, a backward lean, a left lean, a right lean, a left head turn, a right head turn, an upward head tilt, a downward head tilt, a squat, and a jump. In some embodiments of the present invention, the action within the virtual reality scene is a movement of a viewpoint of the user within the virtual reality scene. In some embodiments of the present invention, the action within the virtual reality scene is a change in direction of a viewpoint of the user within the virtual reality scene. In some embodiments of the present invention, the action within the virtual reality scene is a zoom-in or a zoom-out of a viewpoint of the user within the virtual reality scene. In some embodiments of the present invention, the action within the virtual reality scene is a movement of an object displayed within the virtual reality scene.

In some embodiments of the present invention, the system includes a gaze direction processing module configured to receive gaze direction data from the head mounted display, the gaze direction data indicating a vision focus direction of the user upon the virtual reality scene displayed within the head mounted display, and a synchronization module configured to synchronize the gaze direction data with the inertial sensor data to determine a synchronized vision focus direction. In some embodiments of the present invention, the inertial data correlation module is configured to use both the route of movement of the head mounted display and the synchronized vision focus direction to determine the action within the virtual reality scene. In some embodiments of the present invention, the inertial data correlation module is configured to use the synchronized vision focus direction as a directional weighting parameter in determining the action within the virtual reality scene. In some embodiments of the present invention, a magnitude of the directional weighting parameter is proportional to an amount of time that the synchronized vision focus direction persists in a given direction. In some embodiments of the present invention, the synchronization module is configured to temporally align the gaze direction data with the inertial sensor data.

In some embodiments of the present invention, a method includes: A) transmitting video data to a head mounted display for display of a virtual reality scene within the head mounted display, the head mounted display equipped with one or more inertial sensors configured to generate inertial sensor data indicating movement of the head mounted display in accordance with movement of a user by whom the head mounted display is worn, the virtual reality scene requesting the user to make a gesture to cause a specific action within the virtual reality scene, the gesture causing movement of the head mounted display and generation of inertial sensor data corresponding to the movement of the head mounted display, B) receiving inertial sensor data from the head mounted display, the inertial sensor data indicating movement of the head mounted display in response to user making the gesture to cause the specific action within the virtual reality scene, and C) correlating the received inertial sensor data to the specific action within the virtual reality scene, such that the specific action is executed within the virtual reality scene upon subsequent receipt of inertial sensor data substantially equal to the inertial sensor data received in B. In some embodiments of the present invention, correlating the received inertial sensor data to the specific action includes determining a route of movement of the head mounted display and determining a rate of movement of the head mounted display, and recording an association between the specific action and the determined route of movement of the head mounted display and the determined rate of movement of the head mounted display. In some embodiments of the present invention, the method includes repeating A, B, and C for a plurality of specific actions within the virtual reality scene.

In some embodiments of the present invention, the plurality of specific actions within the virtual reality scene include movement actions of moving forward, moving backward, moving left, and moving right, and wherein the gestures made by the user to cause the movement actions are respectively a lean forward, a lean backward, a lean left, and a lean right. In some embodiments of the present invention, the plurality of specific actions within the virtual reality scene include viewing action of looking left, looking right, looking up, and looking down, and wherein the gestures made by the user to cause the viewing actions are respectively a left head turn, a right head turn, an upward head tilt, and downward head tilt. In some embodiments of the present invention, the plurality of specific actions within the virtual reality scene include vertical movement actions of jumping and ducking, and wherein the gestures made by the user to cause the vertical movement actions are respectively a jump and a duck. In some embodiments of the present invention, the plurality of specific actions within the virtual reality scene includes sitting, and wherein the gesture made by the user to cause the sitting is a squat. In some embodiments of the present invention, the plurality of specific actions within the virtual reality scene include zooming actions of zooming in and zooming out, and wherein the gestures made by the user to cause the zooming actions are respectively a head movement forward and a head movement backward. In some embodiments of the present invention, the correlating associates the received inertial sensor data and the specific action to a context of the virtual reality scene.

In some embodiments of the present invention, a method includes: A) transmitting video data to a head mounted display for display of a virtual reality scene within the head mounted display, the head mounted display equipped with one or more inertial sensors configured to generate inertial sensor data indicating movement of the head mounted display in accordance with movement of a user by whom the head mounted display is worn, the virtual reality scene allowing the user to make a gesture to cause a specific action within the virtual reality scene, the gesture causing movement of the head mounted display and generation of inertial sensor data corresponding to the movement of the head mounted display, B) receiving inertial sensor data from the head mounted display, the inertial sensor data indicating movement of the head mounted display in response to user making the gesture to cause the specific action within the virtual reality scene, C) determining a route of user movement and a rate of user movement through processing of the received inertial sensor data, D) determining a movement classification of the virtual reality scene corresponding to the received inertial sensor data, E) correlating the received inertial sensor data to the determined movement classification of the virtual reality scene, and F) recording the correlation of the received inertial sensor data to the determined movement classification of the virtual reality scene in a profile of the user.

Although some method operations have been described in a specific order herein, it should be understood that other housekeeping operations may be performed between operations, or operations may be adjusted so that they occur at slightly different times, or may be distributed in a system which allows the occurrence of the processing operations at various intervals associated with the processing. Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system.

Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A method, comprising:
transmitting video data to a head mounted display for display of a virtual reality scene within the head mounted display;
receiving inertial sensor data from one or more inertial sensors within the head mounted display, the inertial sensor data indicating movement of the head mounted display in accordance with movement of a user by whom the head mounted display is worn, wherein the inertial sensor data provides motion information regarding a route of movement and a rate of movement of the head mounted display from a starting position when the virtual reality scene is displayed by the head mounted display;
determining if the motion information is correlated to a movement of an avatar of the user in a given direction within a current context of the virtual reality scene; and
upon determining that the motion information is correlated to the location movement of the avatar of the user in the given direction, generating an update to the virtual reality scene to reflect an ongoing movement of the avatar of the user in the given direction within the virtual reality scene;
receiving additional inertial sensor data from the one or more inertial sensors within the head mounted display, the additional inertial sensor data providing additional motion information indicating movement of the head mounted display back toward the starting position to cause stoppage of the ongoing movement of the avatar of the user in the given direction within the virtual reality scene.

2. The method as recited in claim 1, further comprising:
querying a calibration table to identify a particular location movement within the virtual reality scene that corresponds to the information regarding the route of movement and the rate of movement of the head mounted display from the starting position, the calibration table defining associations between a number of routes of movement of the head mounted display from the starting position and resulting actions within the virtual reality scene.

3. The method as recited in claim 2, further comprising:
correlating the rate of movement of the head mounted display from the starting position to a rate of the movement of the avatar of the user in the given direction within the virtual reality scene.

4. The method as recited in claim 1, further comprising:
transmitting a feedback signal to the head mounted display, the feedback signal notifying the user that movement of the head mounted display from the starting position does not correspond to an allowable movement of the avatar of the user within the virtual reality scene.

5. The method as recited in claim 1, further comprising:
receiving external inertial sensor data from one or more inertial sensors disposed on the user at locations external to the head mounted display;
using the external inertial sensor data to facilitate correlating the inertial sensor data received from the one or more inertial sensors within the head mounted display to the movement of the avatar of the user in the given direction within the virtual reality scene.

6. The method as recited in claim 1, further comprising:
determining if the motion information is correlated to a zoom-in or a zoom-out of a viewpoint of the user within the current context of the virtual reality scene; and
upon determining that the motion information is correlated to the zoom-in or the zoom-out of the viewpoint of the user within the current context of the virtual reality scene, generating an update to the virtual reality scene to reflect implementation of the zoom-in or the zoom-out of the viewpoint of the user.

7. The method as recited in claim 1, further comprising:
receiving gaze direction data from one or more gaze detectors within the head mounted display, the gaze direction data indicating a vision focus direction of the user upon the virtual reality scene displayed within the head mounted display; and
synchronizing the gaze direction data with the inertial sensor data to determine a synchronized vision focus direction.

8. The method as recited in claim 7, further comprising:
using both the route of movement of the head mounted display from the starting position and the synchronized vision focus direction to determine an action within the virtual reality scene; and
generating an update to the virtual reality scene to reflect implementation of the action.

9. The method as recited in claim 1, wherein an entirety of the virtual reality scene displayed within the head mounted display is computer generated.

10. The method as recited in claim 1, further comprising:
determining if the motion information is correlated to a movement of an object displayed within the current context of the virtual reality scene; and
upon determining that the motion information is correlated to the movement of the object displayed within the current context of the virtual reality scene, generating an update to the virtual reality scene to reflect implementation of the movement of the object.

11. A method, comprising:
receiving video data at a head mounted display, the video data defining a virtual reality scene;
displaying the virtual reality scene within the head mounted display;
operating one or more inertial sensors within the head mounted display to generate inertial sensor data indicating movement of the head mounted display from a starting position in accordance with movement of a user by whom the head mounted display is worn;
transmitting the inertial sensor data to a computing system from which the video data is received, wherein the inertial sensor data provides for determination by the computing system of a route of movement of the head mounted display from the starting position and determination by the computing system of a rate of movement of the head mounted display from the starting position, wherein the route of movement of the head mounted display from the starting position and the rate of movement of the head mounted display from the starting position are mapped by the computing system to a location movement of an avatar of the user in a given direction within a current context of the virtual reality scene;

receiving, from the computing system, video data defining an updated virtual reality scene reflective of an ongoing movement of the avatar of the user in the given direction within the virtual reality scene;

displaying the updated virtual reality scene within the head mounted display;

operating the one or more inertial sensors within the head mounted display to generate additional inertial sensor data indicating movement of the head mounted display back toward the starting position;

transmitting the additional inertial sensor data to the computing system, wherein the additional inertial sensor data provides for determination by the computing system that the ongoing movement of the avatar of the user in the given direction within the virtual reality scene is to stop;

receiving, from the computing system, video data defining a further updated virtual reality scene reflective of stoppage of the ongoing movement of the avatar of the user in the given direction within the virtual reality scene; and displaying the further updated virtual reality scene within the head mounted display.

12. The method as recited in claim 11, further comprising:
receiving, from the computing system, a feedback signal indicating that the route of movement of the head mounted display from the starting position does not correspond to an allowable location movement of the avatar of the user within the current context of the virtual reality scene; and
operating the head mounted display to provide one or more of an audible signal, a tactile signal, and a visual signal to notify the user of receipt of the feedback signal.

13. The method as recited in claim 11, further comprising:
transmitting external inertial sensor data to the computing system from one or more inertial sensors disposed on the user at locations external to the head mounted display, the external inertial sensor data used by the computing system to facilitate determination of the route of movement of the head mounted display from the starting position.

14. The method as recited in claim 11, wherein the movement of the head mounted display from the starting position is correlated to one or more of a zoom-in or a zoom-out of a viewpoint of the user within the virtual reality scene, and a movement of an object displayed within the virtual reality scene.

15. The method as recited in claim 11, further comprising:
operating one or more gaze detectors within the head mounted display to generate gaze direction data indicating a vision focus direction of the user upon the virtual reality scene displayed within the head mounted display; and
transmitting the gaze direction data to the computing system from which the video data is received, the gaze direction data synchronized with the inertial sensor data to determine a synchronized vision focus direction.

16. The method as recited in claim 15, wherein both the route of movement of the head mounted display from the starting position and the synchronized vision focus direction are used to determine the location movement of the avatar of the user in the given direction within the virtual reality scene.

17. The method as recited in claim 11, wherein an entirety of the virtual reality scene displayed within the head mounted display is computer generated.

18. A system, comprising:
an inertial data processing module configured to receive inertial sensor data from a head mounted display, the inertial sensor data indicating movement of the head mounted display in accordance with movement of a user by whom the head mounted display is worn, the inertial data processing module configured to determine from the inertial sensor data a route of movement and a rate of movement of the head mounted display from a starting position when the virtual reality scene is displayed by the head mounted display;
an inertial data correlation module configured to determine if the route of movement and the rate of movement of the head mounted display from the starting position is correlated to a movement of an avatar of the user in a given direction within a current context of the virtual reality scene; and
an inertial data command output module configured to provide a command signal to a rendering engine upon determining that the route of movement and the rate of movement of the head mounted display from the starting position is correlated to the movement of the avatar of the user in the given direction within the current context of the virtual reality scene, the command signal directing the rendering engine to update the virtual reality scene to reflect an ongoing movement of the avatar of the user in the given direction within the virtual reality scene,
wherein the inertial data processing module is configured to receive additional inertial sensor data from the head mounted display, and wherein the inertial data correlation module is configured to determine that the additional inertial sensor data indicates movement of the head mounted display back toward the starting position, and wherein inertial data command output module is configured to provide a further command signal to the rendering engine upon determination that the additional inertial sensor data indicates movement of the head mounted display back toward the starting position, the further command signal directing the rendering engine to update the virtual reality scene to reflect a stoppage of movement of the avatar of the user in the given direction within the virtual reality scene.

19. The system as recited in claim 18, wherein the inertial data correlation module is configured to map the rate of movement of the head mounted display from the starting position to a rate of the movement of the avatar of the user in the given direction within the virtual reality scene.

20. The system as recited in claim 19, wherein the inertial data correlation module is configured to query a calibration table in order to map the route of movement and the rate of movement of the head mounted display from the starting position to the movement of the avatar of the user in the given direction within the virtual reality scene.

21. The system as recited in claim 18, further comprising:
an inertial data feedback module configured to generate and transmit a feedback signal to the head mounted display, the feedback signal notifying the user that the route of movement of the head mounted display from the starting position does not correspond to an allowable movement of the avatar of the user within the current context of the virtual reality scene.

22. The system as recited in claim 18, further comprising:
a gaze direction processing module configured to receive gaze direction data from the head mounted display, the gaze direction data indicating a vision focus direction of the user upon the virtual reality scene displayed within the head mounted display; and
a synchronization module configured to synchronize the gaze direction data with the inertial sensor data to determine a synchronized vision focus direction, wherein the inertial data correlation module is configured to use both the route of movement of the head mounted display from the starting position and the synchronized vision focus direction to determine the movement of the avatar of the user in the given direction within the virtual reality scene.

23. The system as recited in claim 22, wherein the inertial data correlation module is configured to use the synchronized vision focus direction as a directional weighting parameter in determining the movement of the avatar of the user in the given direction within the virtual reality scene.

24. The system as recited in claim 18, wherein an entirety of the virtual reality scene displayed within the head mounted display is computer generated.

* * * * *